US011536965B2

United States Patent
Siever

(10) Patent No.: US 11,536,965 B2
(45) Date of Patent: Dec. 27, 2022

(54) TECHNOLOGIES FOR MULTI-RANDOMIZED AUDIO-VISUAL ENTRAINMENT

(71) Applicant: Mind Alive Inc., Edmonton (CA)

(72) Inventor: David Siever, Edmonton (CA)

(73) Assignee: Mind Alive Inc., Edmonton (CA)

( * ) Notice: Subject to any disclaimer, the term of this patent is extended or adjusted under 35 U.S.C. 154(b) by 253 days.

(21) Appl. No.: 17/076,983

(22) Filed: Oct. 22, 2020

(65) Prior Publication Data

US 2021/0124172 A1    Apr. 29, 2021

Related U.S. Application Data

(60) Provisional application No. 62/925,294, filed on Oct. 24, 2019.

(51) Int. Cl.
*G02B 27/01* (2006.01)
*G02B 27/02* (2006.01)
(Continued)

(52) U.S. Cl.
CPC ....... *G02B 27/0172* (2013.01); *G02B 27/024* (2013.01); *H04N 13/344* (2018.05);
(Continued)

(58) Field of Classification Search
CPC .............. G02B 27/0172; G02B 27/024; G02B 2027/0134; G02B 2027/014; G02B 2027/0178; G02B 27/017; G02B 2027/0187; H04N 13/344; H04R 3/12; H04R 5/04; H04R 2430/03; H04R 5/033;
(Continued)

(56) References Cited

U.S. PATENT DOCUMENTS

| 4,315,502 A | 2/1982 | Gorges |
| 5,599,274 A | 2/1997 | Widjaja et al. |

(Continued)

FOREIGN PATENT DOCUMENTS

| DE | 3823402 | 1/1990 |
| RU | 2336020 | 10/2008 |
| WO | WO2019/074637 | 4/2019 |

*Primary Examiner* — Nelson M Rosario
(74) *Attorney, Agent, or Firm* — Dentons US LLP

(57) ABSTRACT

Technologies that stimulate the mammalian central nervous system are described. A method includes: (a) causing a pair of glasses to be worn by a user, where the pair of glasses hosts/interacts with a processor, a first light source, a second light source, a first sound source, and a second sound source; (b) causing the processor to read sets of parameters that include information regarding base frequencies, variability, frequency ranges, and time ranges, where the frequency ranges are positively and negatively off the base frequencies; and (c) causing the processor to request the light sources to (i) flash light to visual fields (left/right) of each eye according to selected frequencies for a duration of time and to (ii) pulse sound to the each ear according to selected frequencies for a duration of time such that an audio-visual entrainment (AVE) occurs that causes neuron and the glia to respond dynamically to the AVE. The frequencies are randomly selected from a frequency range and the duration of stimulation time is randomly selected from a time range.

20 Claims, 9 Drawing Sheets

(i)

(ii)

(51) Int. Cl.
*H04N 13/344* (2018.01)
*H04R 5/04* (2006.01)
*H04R 3/12* (2006.01)

(52) U.S. Cl.
CPC ............. H04R 3/12 (2013.01); H04R 5/04 (2013.01); *G02B 2027/0134* (2013.01); *G02B 2027/0178* (2013.01)

(58) Field of Classification Search
CPC ............ A61B 5/04842; A61B 5/04845; A61B 5/0496; A61B 5/165; A61B 5/4064; A61B 5/6803; A61B 2560/0493; A61B 5/0024; A61B 5/02416; A61B 5/02438; A61B 5/0261; A61B 5/0482; A61B 5/0488; A61B 5/7267; A61B 5/744; A61B 5/0476; A61M 21/00; A61M 2021/0022; A61M 2021/0027; A61M 2021/0044; A61M 2021/0066; A61M 2230/10; A61M 2230/14; G02C 11/10; G02C 7/027; G06F 16/90; G06F 3/013; G06F 3/015; G06F 3/048; G06F 3/0487; G06F 3/011; G06F 3/0484; G06F 1/163; G06F 3/017; G06F 3/04842; G06F 2203/0381; G09G 3/003; H04W 4/04; H04L 67/12; H04M 1/05; H04M 2250/12; G06K 9/20; G06T 7/20

See application file for complete search history.

(56) References Cited

U.S. PATENT DOCUMENTS

| | | | |
|---|---|---|---|
| 5,709,645 A | 1/1998 | Siever | |
| 6,544,165 B1 | 4/2003 | McNew | |
| 10,799,667 B2* | 10/2020 | Hanbury | A61B 5/02405 |
| 2005/0149144 A1 | 7/2005 | Siever | |
| 2014/0336473 A1* | 11/2014 | Greco | A61B 5/7225 |
| | | | 600/509 |

* cited by examiner

Fixed vs Randomized AVE in General Population as Compared to Baseline

TECHNOLOGIES FOR MULTI-RANDOMIZED AUDIO-VISUAL ENTRAINMENT

CROSS-REFERENCE TO RELATED PATENT APPLICATION

This patent application claims a benefit of U.S. Provisional Patent Application 62/925,294 filed 24 Oct. 2019, which is herein incorporated by reference for all purposes.

TECHNICAL FIELD

This patent application relates to medical technologies that stimulate the mammalian central nervous system, such as neuron and the glia.

BACKGROUND

There is a desire for a technology to enable stimulation of the mammalian central nervous system, such as neuron and the glia, using randomized audio-visual entrainment to at least one of prevent, diagnose, monitor, ameliorate, or treat a medical condition, a disease, or a disorder of a patient, such as a mammal, such as an animal, such as a human, whether male or female, whether infant, child, adult, or elderly, or others. However, such technology is not known to exist. Therefore, this disclosure enables such technology.

SUMMARY

Certain embodiments may provide a method comprising: causing a pair of glasses to be worn by a user having a right eye, a left eye, a right ear, a left ear, a neuron, and a glia, wherein the right eye has a first right visual field and a first left visual field, wherein the left eye has a second right visual field and a second left visual field, wherein the pair of glasses hosts a processor, a first light source, a second light source, a first sound source, and a second sound source; causing the processor to read a first set of parameters, a second set of parameters, a third set of parameters, and a fourth set of parameters, wherein the first set of parameters includes a first base frequency, a first amount of variability, a first frequency range, and a first time range, wherein the first frequency range is positively and negatively off the first base frequency based on the first amount of variability, wherein the second set of parameters includes a second base frequency, a second amount of variability, a second frequency range, and a second time range, wherein the second frequency range is positively and negatively off the second base frequency based on the second amount of variability, wherein the third set of parameters includes a third base frequency, a third amount of variability, a third frequency range, and a third time range, wherein the third frequency range is positively and negatively off the third base frequency based on the third amount of variability, wherein the fourth set of parameters includes a fourth base frequency, a fourth amount of variability, a fourth frequency range, and a fourth time range, wherein the fourth frequency range is positively and negatively off the fourth base frequency based on the fourth amount of variability; and causing the processor to request (a) the first light source to flash a first light to the first right visual field and the second light source to flash a second light to the second right visual field according to a first frequency for a first duration of time, (b) the first light source to flash a third light to the first left visual field and the second light source to flash a fourth light to the second left visual field according to a second frequency for a second duration of time, (c) the first sound source to pulse a first sound to the right ear according to a third frequency for a third duration of time, and (d) the second sound source to pulse a second sound to the left ear according to a fourth frequency for a fourth duration of time such that an audio-visual entrainment (AVE) occurs and thereby causes the neuron and the glia to respond dynamically to the AVE, wherein the first frequency is randomly selected from the first frequency range and the first duration of time is randomly selected from the first time range, wherein the second frequency is randomly selected from the second frequency range and the second duration of time is randomly selected from the second time range, wherein the third frequency is randomly selected from the third frequency range and the third duration of time is randomly selected from the third time range, wherein the fourth frequency is randomly selected from the fourth frequency range and the fourth duration of time is randomly selected from the fourth time range.

Certain embodiments may provide a memory storing a set of instructions executable by a processor of a pair of glasses when the pair of glasses is worn by a user having a right eye, a left eye, a right ear, a left ear, a neuron, and a glia, wherein the right eye has a first right visual field and a first left visual field, wherein the left eye has a second right visual field and a second left visual field, wherein the pair of glasses hosts a first light source, a second light source, a first sound source, and a second sound source, wherein the set of instructions causes the processor to: read a first set of parameters, a second set of parameters, a third set of parameters, and a fourth set of parameters, wherein the first set of parameters includes a first base frequency, a first amount of variability, a first frequency range, and a first time range, wherein the first frequency range is positively and negatively off the first base frequency based on the first amount of variability, wherein the second set of parameters includes a second base frequency, a second amount of variability, a second frequency range, and a second time range, wherein the second frequency range is positively and negatively off the second base frequency based on the second amount of variability, wherein the third set of parameters includes a third base frequency, a third amount of variability, a third frequency range, and a third time range, wherein the third frequency range is positively and negatively off the third base frequency based on the third amount of variability, wherein the fourth set of parameters includes a fourth base frequency, a fourth amount of variability, a fourth frequency range, and a fourth time range, wherein the fourth frequency range is positively and negatively off the fourth base frequency based on the fourth amount of variability; and request (a) the first light source to flash a first light to the first right visual field and the second light source to flash a second light to the second right visual field according to a first frequency for a first duration of time, (b) the first light source to flash a third light to the first left visual field and the second light source to flash a fourth light to the second left visual field according to a second frequency for a second duration of time, (c) the first sound source to pulse a first sound to the right ear according to a third frequency for a third duration of time, and (d) the second sound source to pulse a second sound to the left ear according to a fourth frequency for a fourth duration of time such that an audio-visual entrainment (AVE) occurs and thereby causes the neuron and the glia to respond dynamically to the AVE, wherein the first frequency is randomly selected from the first frequency range and the first duration of time is randomly selected from the first time range, wherein the second frequency is randomly selected from the second frequency range and the second duration of time is randomly selected from the second time range, wherein the third frequency is randomly selected from the third frequency range and the third duration of time is randomly selected from the third time range, wherein the fourth frequency is randomly selected from the fourth frequency range and the fourth duration of time is randomly selected from the fourth time range.

Certain embodiments may provide a device including: a pair of glasses configured to be worn by a user having a right eye, a left eye, a right ear, a left ear, a neuron, and a glia, wherein the right eye has a first right visual field and a first left visual field, wherein the left eye has a second right visual field and a second left visual field, wherein the pair of glasses hosts a processor, a first light source, a second light source, a first sound source, and a second sound source, wherein the processor is programmed to: read a first set of parameters, a second set of parameters, a third set of parameters, and a fourth set of parameters, wherein the first set of parameters includes a first base frequency, a first amount of variability, a first frequency range, and a first time range, wherein the first frequency range is positively and negatively off the first base frequency based on the first amount of variability, wherein the second set of parameters includes a second base frequency, a second amount of variability, a second frequency range, and a second time range, wherein the second frequency range is positively and negatively off the second base frequency based on the second amount of variability, wherein the third set of parameters includes a third base frequency, a third amount of variability, a third frequency range, and a third time range, wherein the third frequency range is positively and negatively off the third base frequency based on the third amount of variability, wherein the fourth set of parameters includes a fourth base frequency, a fourth amount of variability, a fourth frequency range, and a fourth time range, wherein the fourth frequency range is positively and negatively off the fourth base frequency based on the fourth amount of variability; and request (a) the first light source to flash a first light to the first right visual field and the second light source to flash a second light to the second right visual field according to a first frequency for a first duration of time, (b) the first light source to flash a third light to the first left visual field and the second light source to flash a fourth light to the second left visual field according to a second frequency for a second duration of time, (c) the first sound source to pulse a first sound to the right ear according to a third frequency for a third duration of time, and (d) the second sound source to pulse a second sound to the left ear according to a fourth frequency for a fourth duration of time such that an audio-visual entrainment (AVE) occurs and thereby causes the neuron and the glia to respond dynamically to the AVE, wherein the first frequency is randomly selected from the first frequency range and the first duration of time is randomly selected from the first time range, wherein the second frequency is randomly selected from the second frequency range and the second duration of time is randomly selected from the second time range, wherein the third frequency is randomly selected from the third frequency range and the third duration of time is randomly selected from the third time range, wherein the fourth frequency is randomly selected from the fourth frequency range and the fourth duration of time is randomly selected from the fourth time range.

DETAILED DESCRIPTION

Figure 1:
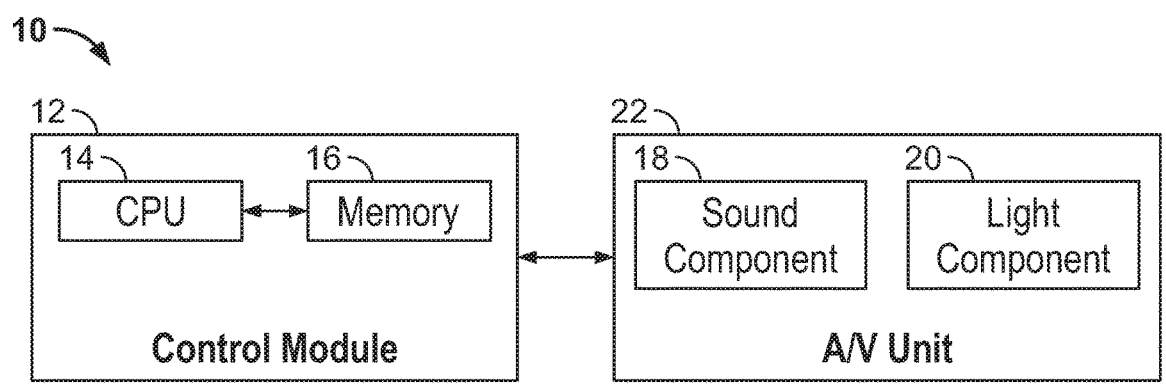
FIG. 1 is an example audio-visual entrainment system to implement the described methods.

Various terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Various terminology used herein is for describing example embodiments and is not intended to be necessarily limiting of this disclosure. As used herein, various singular forms "a," "an" and "the" are intended to include various plural forms (e.g., 2, 3, 4, 5, 6, 7, 8, 9, 10, tens, hundreds, thousands) as well, unless a context clearly indicates otherwise.

Various terms, such as "comprises," "includes" and/or "comprising," "including", when used in this specification, specify a presence of stated features, integers, steps, operations, elements, and/or components, but do not preclude the presence and/or addition of one or more other features, integers, steps, operations, elements, components, and/or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

As used herein, a term "about" and/or "substantially" refers to a +/−10% variation from a nominal value/term. Such variation is always included in any given value/term provided herein, whether or not such variation is specifically referred thereto.

Unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized and/or overly formal sense unless expressly so defined herein.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

Generally, the human brain tends to follow rhythm. The electrical activity (EEG) of our brain is rhythmic and seen as brain waves. For example, when we listen to music with a fast beat, our brain waves tend to speed up and when we listen to music with a slow beat, our brain waves tend to slow down. It is also known that flashing lights can affect brain waves. Flashing a light steadily into the eye will stimulate the brain to encourage brain waves to entrain to the same frequency as the flashing light (i.e., the amplitude of the brain waves, at the same frequency as the flashing light, will increase). Flashing the light faster will increase the amplitude of higher frequency or faster brain waves, whereas flashing the light slower will increase amplitude of lower frequency or slower brain waves. This frequency following effect of brain waves in response to rhythmic stimulation is called brain wave entrainment.

Audio-visual entrainment (AVE) refers to the use of flashing lights together with rhythmic tones to purposefully entrain brain waves toward some desired rhythm or frequency. By stimulating the brain with flashing lights using purpose made glasses and pulsing tones through head/earphones it is possible to shift the frequency of the dominant brain waves either higher or lower and thereby change brain arousal and function.

Human brains produce four basic brainwave states: beta, alpha, theta and delta. A healthy brain will produce the appropriate brainwaves for a given situation. For example, when sleeping the brain normally shows elevated low frequency delta activity and reduced amounts of higher frequency theta, alpha and beta waves. By contrast, when awake, the normal brain shows predominantly alpha and beta activity with less theta and very little delta activity. During concentration, the brain shows primarily beta wave activity.

Due to stress, neurotransmitter imbalances, genetic factors, brain injury, or other trauma, people may produce too much or too little of various brain waves for certain activities. For example, people who have trouble falling asleep and/or experience frequent waking during the night do not produce enough very low frequency delta brain waves at bedtime and, when they do manage to fall asleep, will frequently experience bursts of higher frequency alpha activity that will bring them into a wake state. Another problem is seen in people with Attention-Deficit Disorder (ADD) and dementia, including Alzheimer's disease, where they produce too much slow wave theta activity when they try to do mental tasks (i.e., mathematics, reading, etc.).

Various embodiments described in the present application provide multi-randomization audio-visual entrainment (AVE) stimulation, and, more particularly, various methods of stimulating the left/right visual fields of both eyes and stimulating the left and right ears with sound using randomized frequency for each of the four stimulations and using randomized stimulation time. This multi-randomization method provides a constantly and randomly changing environment in which both neurons and glia (non-neuronal cells [i.e., not nerves] of the brain and nervous system: there are a variety of subtypes of glial cells, including astrocytes, oligodendrocytes, and microglia, each of which is specialized for a function) must respond to on a dynamic basis. The randomness of stimulation provides an endless variety of latencies between the various stimuli to which the brain must accommodate and therefore improve in functionality in accommodating these stimuli. For instance, because of the wide variety of motion in dancing, activities such as dancing stimulate more brain activity than simply walking or running.

For example, the described technologies (e.g., methods) can be configured to prevent, diagnose, monitor, ameliorate, or treat neurological, neuropsychological, or neuropsychiatric activity, such as a modulation of neuronal function or processing to affect a functional outcome. The modulation of neuronal function can be useful regarding diagnosing, monitoring, preventing, treating, or ameliorating neurological, psychiatric, psychological, conscious state, behavioral, mood, or thought activity. For example, this activity can manifests itself in a form of a disorder, such as attention or cognitive disorders (e.g., Autistic Spectrum Disorders), mood disorder (e.g., major depressive disorder, bipolar disorder, dysthymic disorder), anxiety disorder (e.g., panic disorder, post-traumatic stress disorder, obsessive-compulsive disorder, phobic disorder); neurodegenerative diseases (e.g., multiple sclerosis, Alzheimer's disease, amyotrophic lateral sclerosis (ALS), Parkinson's disease, Huntington's Disease, Guillain-Barre syndrome, myasthenia gravis, and chronic idiopathic demyelinating disease (CID)), movement disorders (e.g., dyskinesia, tremor, dystonia, chorea and ballism, tic syndromes, Tourette's Syndrome, myoclonus, drug-induced movement disorders, Wilson's Disease, Paroxysmal Dyskinesias, Stiff Man Syndrome and Akinetic-Ridgid Syndromes and Parkinsonism), epilepsy, tinnitus, pain, phantom pain, diabetes neuropathy, enhancing or diminishing any neurological or psychiatric function not just an abnormality or disorder or others, as understood to skilled artisans and which are only omitted here for brevity. Neurological activity that may be modulated can include normal functions, such as alertness, conscious state, drive, fear, anger, anxiety, repetitive behavior, impulses, urges, obsessions, euphoria, sadness, and the fight or flight response, as well as instability, vertigo, dizziness, fatigue, photophobia, concentration dysfunction, memory disorders, headache, dizziness, irritability, fatigue, visual disturbances, sensitivity to noise (misophonia, hyperacusis, phonophobia), judgment problems, depression, symptoms of traumatic brain injury (whether physical, emotional, social, or chemical), autonomic functions, which includes sympathetic or parasympathetic functions (e.g., control of heart rate), somatic functions, or enteric functions.

FIG. 1 illustrates an AVE system 10 used to implement the methods of the described embodiments. The system 10 includes a control module 12 having a processor (CPU) 14 and a memory 16. The control module 12 manages the operation of an audio-visual (NV) unit 22 (e.g., an optical head-mounted display, a pair of eyeglasses, a hat, a helmet, a head-worn frame, an earpiece). The A/V unit 22 includes a sound producing and stimulating component 18 (e.g., a transducer, a speaker) and a light producing and stimulating component 20 (e.g., a light source, a light bulb, a light emitting diode). Although the control module 12 and the A/V unit 22 are shown as physically separate from each other (yet in communication), in other embodiments, the control module 12 and the A/V unit 22 are not physically separate from each other. For example, the A/V unit 22 can host the control module 12.

Figure 2:
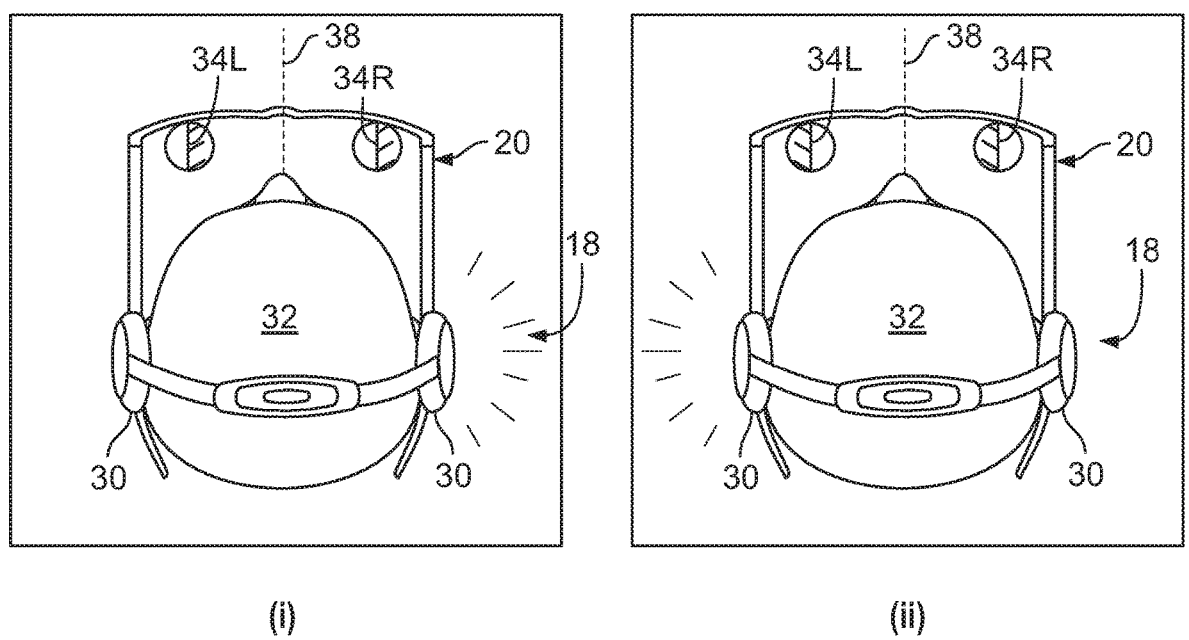
FIG. 2 schematically illustrates placement of the AV stimulation components of FIG. 1 on a user.

Referring to FIG. 2, the sound producing and stimulating component 18 includes headphones/earphones 30 to direct sound signals to the ears (right and left) of a person 32. The light producing and stimulating component 20 includes light sources 34R and 34L arranged on a pair of glasses/goggles 36 (or another head-worn optical headset) that direct light toward the eyes (right and left) of the person 32. An optional separator/blocker 38 (e.g., a wall, a partition) is used between the left and right light sources 34L/R to prevent the light sources 34L/R from illuminating more than their associated visual field.

In the most generalized implementation, all four stimuli ([1] right visual fields (of both eyes); [2] left visual fields (of both eyes); [3] right audio and [4] left audio) are independently randomized from each other. Alternatively, the four stimuli can be coordinated or grouped in various combinations, such as right visual field (of both eyes) stimulation coordinated with right audio stimulation as shown in FIG. 2(i) or (b) left visual field (of both eyes) stimulation coordinated with left audio stimulation as shown in FIG. 2(ii).

The light sources 34L/R produce light and the headphones 30 produce sound in response to light and audio signals, respectively, provided by light and sound component 18/20 of the A/V unit 22.

U.S. Pat. No. 5,709,645, incorporated herein by reference in its entirety for all purposes as if copied and pasted herein, is an example AVE system 10 that can deliver visual signals to the left and right visual fields of each eye and sound signals to the ears. In general, the photic device includes an eye mask with independent left and right eye pieces and means of fitting the eye mask over the subject's eyes. Each eyepiece contains a dedicated light-producing assembly having two independent sets of light sources, one for each of the left and right visual fields of each eye. Each of the light sources is independently operable to pulse light into the corresponding visual field of each eye, thereby stimulating that visual field.

Audio-visual entrainment (AVE) is a technique involving the flashing of lights into the eyes via an eye set and pulsed tones into the ears at various frequencies. As previously described, although AVE at a fixed frequency has shown effectiveness for a variety of mental health conditions, the inventor has found that when the A/V stimulation is randomized within a frequency range of about ±0.1 Hz to about ±3 Hz, the clinical effects are increased significantly compared to traditional fixed frequency entrainment. Improved results apply to relaxation, heart rate variability breathing, anxiety, worry in students, depression, traumatic brain injury, improving cognition in seniors with age-related cognitive decline, for reversing the cognitive losses in Alzheimer's Disease, and other medical conditions disclosed herein.

The inventor has found that when extending randomization beyond the stated amount of variability (i.e., over about ±3 Hz), the clinical effects are diminished to the point where they are less effective than fixed frequency entrainment. The inventor has found that there is a balance point where the entrainment and the randomized stimulation effects on the brain have a maximal effect. So even though randomization at about ±3 Hz and beyond are exceptionally stimulating, the swing in frequency becomes too broad for any sense of entrainment to be maintained.

The described randomization is accomplished via the control module 12 that provides independent left and right randomization of the left and right visual fields and randomized auditory tone pulses in both time and frequency. A random variable is generated by processor 14 of the control module 12, each time the control module 12 is initialized (i.e., powered up) to generate a different set of randomized variables, thus preventing similar randomization occurring during repeated uses of the system 10. The left and right side signals may be randomized in synchrony with each other or independently of each other.

Figure 3:
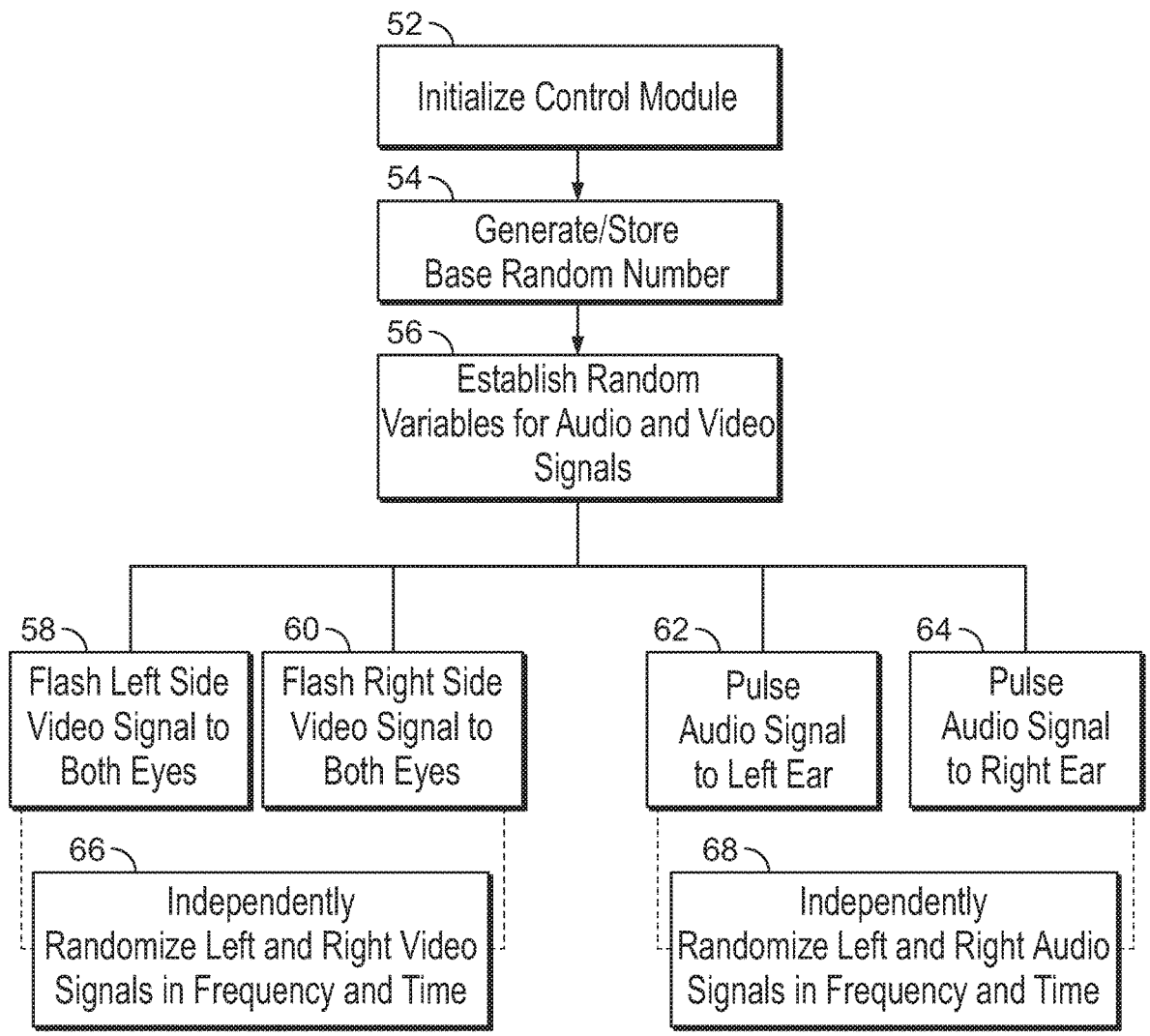
FIG. 3 is a flow chart of a multi-randomized AVE method according to an embodiment.

FIG. 3 illustrates a multi-randomized AVE method 50. The control module 12 is initialized (powered up) at step 52. A base random number is generated by the processor 14 and stored in the memory 16 at step 54 in order to establish random variables at step 56 used by the A/V unit 22 to generate random audio signals and the visual signals. The left side visual signal is flashed to the left visual fields of both eyes at step 58 (see FIG. 2(ii)). The right side visual signal is flashed to the right visual fields of both eyes at step 60 (see FIG. 2(i)). The left side audio signal is pulsed to the left ear at step 62 (see FIG. 2(i)). The right side audio signal is pulsed to the right ear at step 64 (see FIG. 2(i)). As discussed above, the visual signals (left/right) and the audio signals (left/right) are all independently randomized in time and frequency at steps 66 and 68. The randomization of the stimulation frequencies occurs around a selected start frequency within a range (about ±0.1 Hz to about ±3 Hz) and the randomization of the stimulation time is within a prescribed treatment range. Example frequency and time ranges and randomization ranges are further detailed below.

Figure 4:
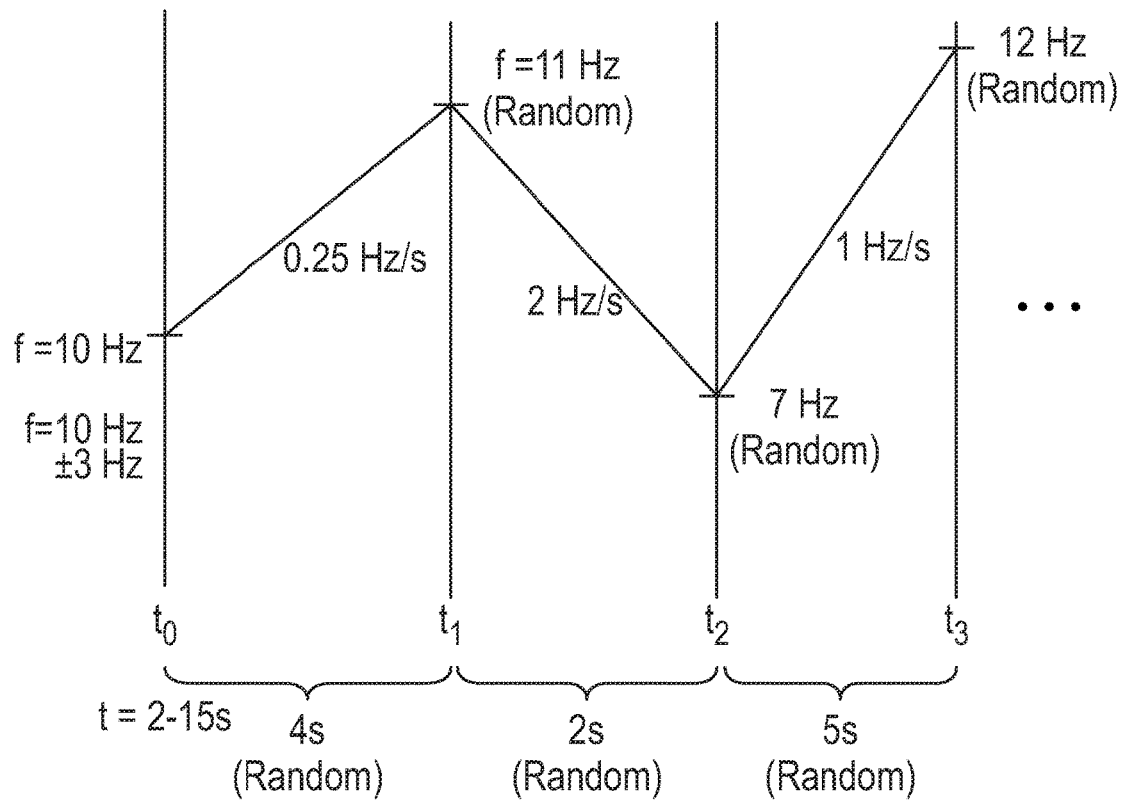
FIG. 4 is a sample stimulation profile according to an embodiment.

A sample stimulation profile is shown in FIG. 4. Each of the four stimulations (left/right visual fields of both eyes and left/right ears) can follow this profile. Take a start frequency of about 10 Hz (although other frequency higher or lower are possible) and a randomized frequency range of about ±3 Hz (meaning the stimulation frequency can range from about 7 Hz to about 13 Hz) with time of stimulation ranging from about 2 seconds to about 15 seconds (although lower bound or upper bound can be higher or lower, whether whole or decimal, thereby changing this range). At the start of a session (to) stimulation occurs for about 4 seconds while transitioning to a randomized frequency of about 11 Hz: the stimulation frequency then linearly transitions from about 10 Hz to about 11 Hz over about 4 seconds (about 0.25 Hz/s); then at $t_1$ the stimulation frequency starts at about 11 Hz and ends at the next randomized frequency of about 7 Hz over about 2 seconds (about 2 Hz/s); then at $t_2$ the simulation frequency starts at about 7 Hz and ends at the next randomized frequency of about 12 Hz over about 5 seconds (about 1 Hz/s). These randomized frequency/time transitions continue for the duration of the treatment.

The inventor used electroencephalography (EEG), quantitative EEG (qEEG), cognitive and psychometric questionnaires to understand the underlying neurophysiology and to develop a treatment modality that can trigger a recovery in brain function. Summarized results of which are shown in the graphs of FIGS. 5A to 9B. In the tables: "f" represents the start frequency (visual and audio) suitably selected for a particular treatment; "T range" represents the selected time range for stimulation (visual and audio); "Range" presents the range of randomized frequency possible based on the start frequency (f) and the selected randomization amount (i.e., between about ±0.1 Hz to about ±3 Hz).

The "B" graphs (FIG. 5B to 9B) show stimulation traces using various protocols with randomization showing frequency (Hz) v. time (s) traces of left side brain stimulation (solid line) and right side brain stimulation (dashed line). The solid and dashed lines illustrate a mean frequency. As these frequencies are transitioning up and down over time, there is randomization (e.g., between about ±0.1 Hz to about ±3 Hz) at every given point along the slope of the lines. The solid line at 5 Hz represents the tone pitch. The dash-dotted lines in FIGS. 6B, 7B, 8B and 9B represents the heartbeat.

Figure 5A:
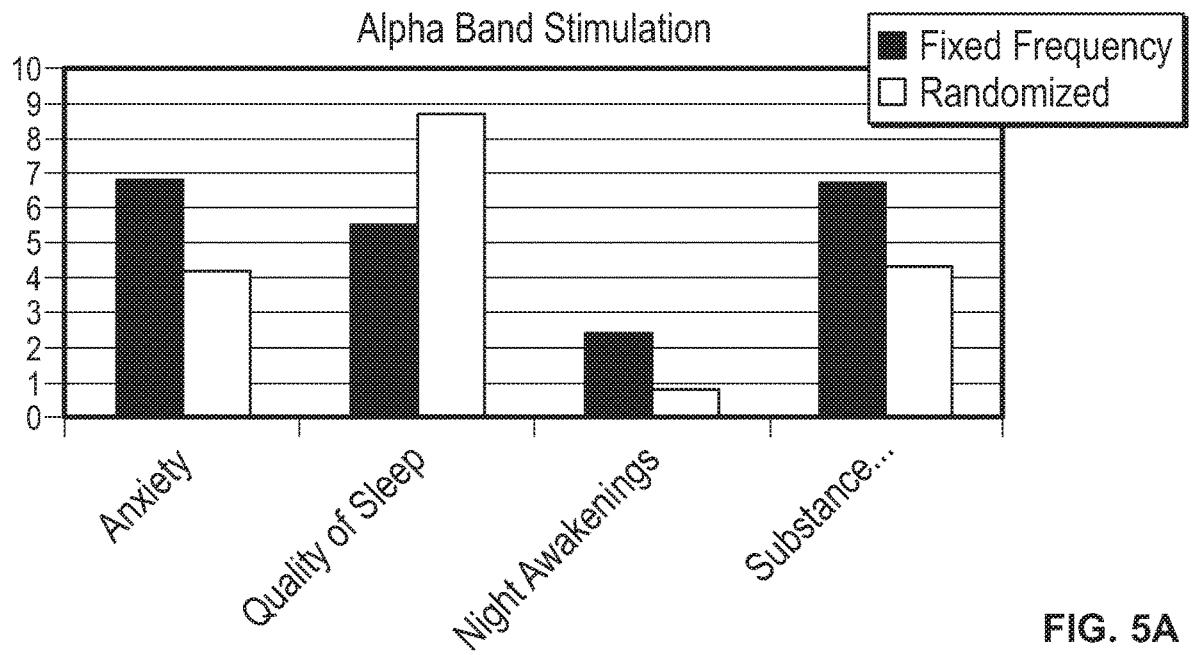
FIG. 5A is a graph comparing fixed AVE versus multi-randomized AVE in the general population considering anxiety, quality of sleep, night awakenings, and substance abuse.

Multi-Randomized AVE in General Population (FIG. 5A)

Figure 5B:
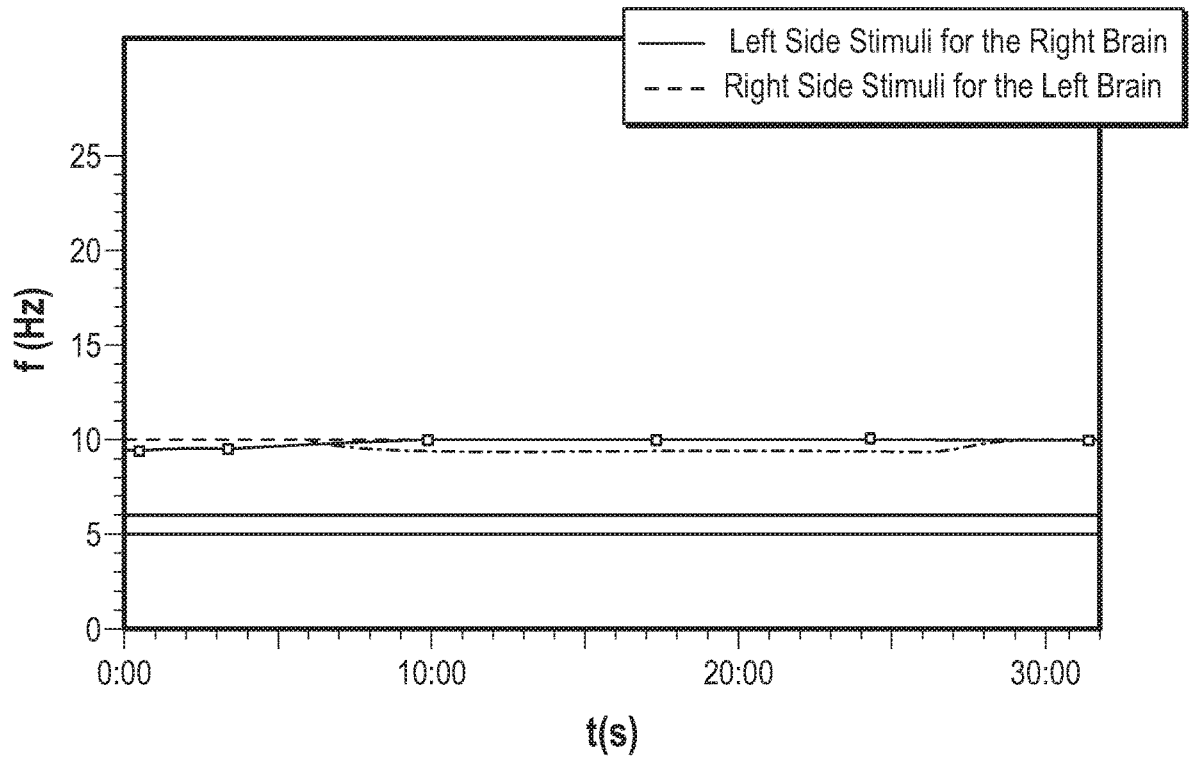
FIG. 5B is a graph using alpha relaxer with randomization showing frequency (Hz) v. time (s) traces of left side brain stimulation (solid line) and right side brain stimulation (dashed line)

Alpha Protocol (FIG. 5B)

| Left Visual Field (both eyes) | Right Visual Field (both eyes) | Left Ear Audio | Right Ear Audio |
| --- | --- | --- | --- |
| Base f = about 10 Hz Randomized about ±1.25 Hz Range about 8.5 Hz-about 11.5 Hz T range about 2 s-about 15 s | Base f = about 10 Hz Randomized about ±1 Hz Range about 9 Hz-about 11 Hz T range about 2 s-about 15 s | Base f = about 10 Hz Randomized about ±1.25 Hz Range about 8.5 Hz-about 11.5 Hz T range about 2 s-about 15 s | Base f = about 10 Hz Randomized about ±1 Hz Range about 9 Hz-about 11 Hz T range about 2 s-about 15 s |

FIG. 5A shows results in anxiety, quality of sleep, night awakenings and substance abuse issues are improved using the multi-randomized AVE method of 50 versus traditional fixed frequency AVE techniques.

Figure 6A:
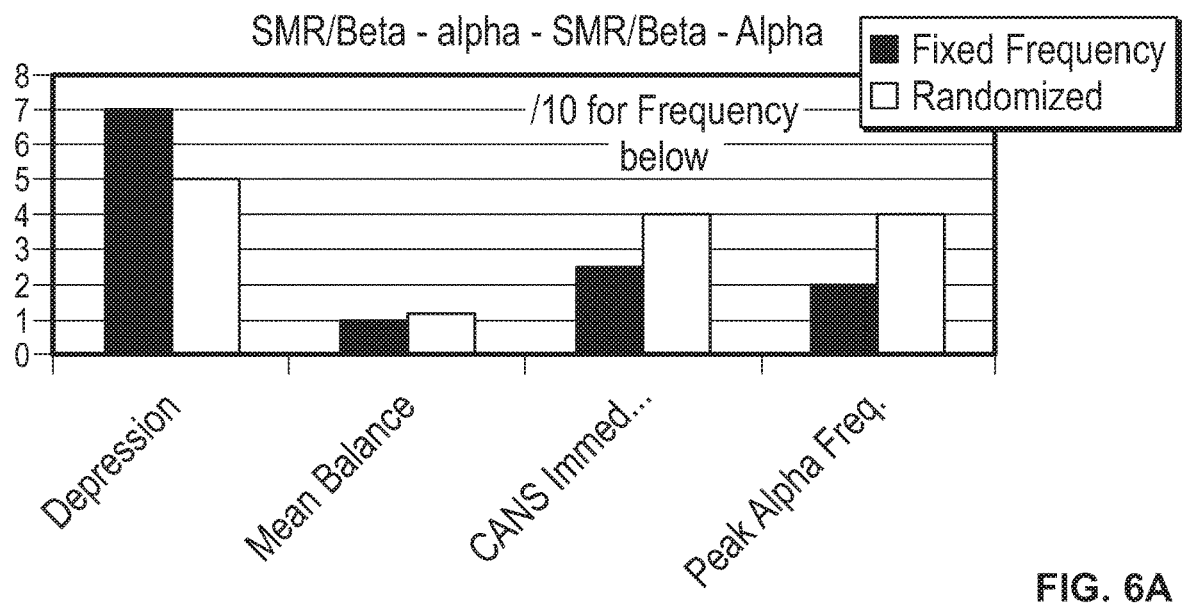
FIG. 6A is a graph comparing fixed AVE versus multi-randomized AVE with seniors considering depression, mean balance, CANS and peak alpha.

Multi-Randomized AVE in Seniors with Cognitive Decline (FIG. 6A)

Figure 6B:
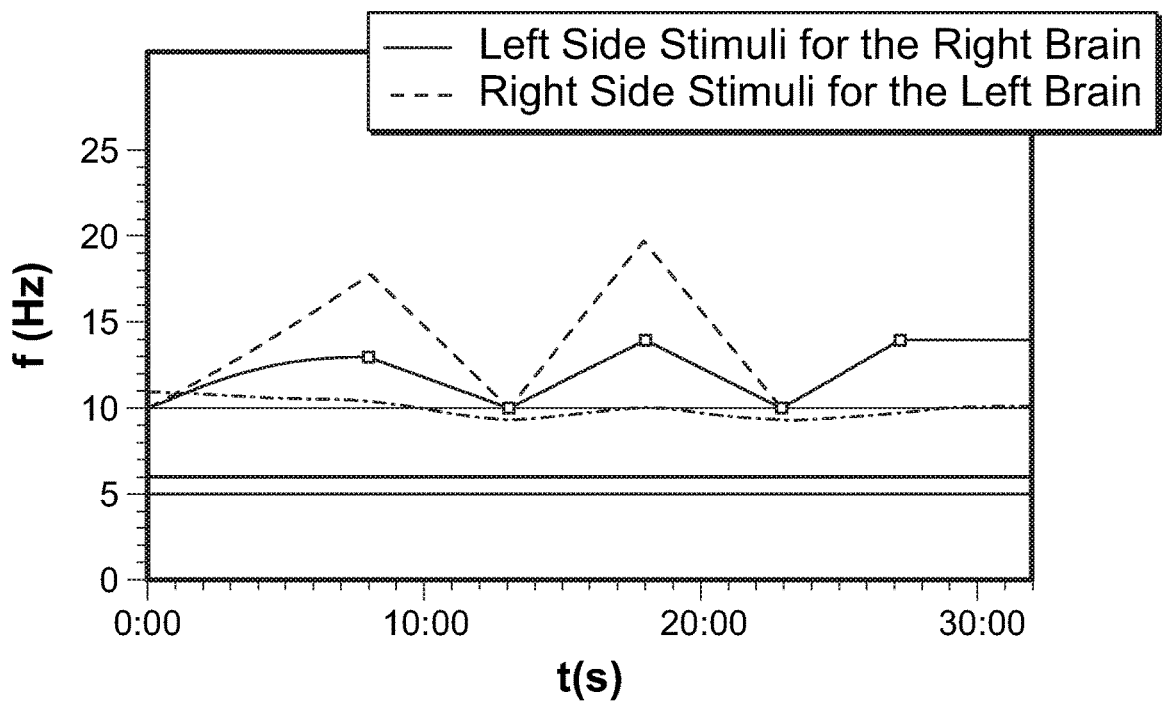
FIG. 6B is a graph using brain brightener with randomization showing frequency (Hz) v. time (s) traces of left side brain stimulation (solid line) and right side brain stimulation (dashed line)

Brain Brightener Protocol (FIG. 6B)

| Left Visual Field (both eyes) | Right Visual Field (both eyes) | Left Ear Audio (Same as left visual field, but independently randomized) | Right Ear Audio (Same as right visual field, but independently randomized) |
| --- | --- | --- | --- |
| Base f = about 10 Hz-about 14 Hz Randomized about ±1 Hz Range about 9 Hz-about 15 Hz T range about 2 s to about 15 s | Base f = about 10 Hz-about 21 Hz Randomized about ±1 Hz Range about 9 Hz-about 22 Hz T range about 2 s to about 15 s | Base f = about 10 Hz-about 14 Hz Randomized about ±1 Hz Range about 9 Hz-about 15 Hz T range about 2 s to about 15 s | Base f = about 10 Hz-about 21 Hz Randomized about ±1 Hz Range about 9 Hz-about 22 Hz T range about 2 s to about 15 s |

FIG. 6A shows results in depression, mean balance, Child and Adolescent Needs and Strengths (CANS) and peak alpha frequency are improved using the multi-randomized AVE method of 50 versus traditional fixed frequency AVE techniques.

Consider FIG. 6B, stimulation frequency transitions between about 10 Hz and about 14 Hz on the left side (solid line) and between about 10 Hz to about 21 Hz on the right side (dashed line). As these frequencies are transitioning up and down, there is randomization of about ±1 Hz at every given point along the slope of the lines (i.e., the left/right side traces are mean frequencies), making the overall frequency range from about 9 Hz to about 15 Hz and about 9 Hz to about 21 Hz.

Figure 7A:
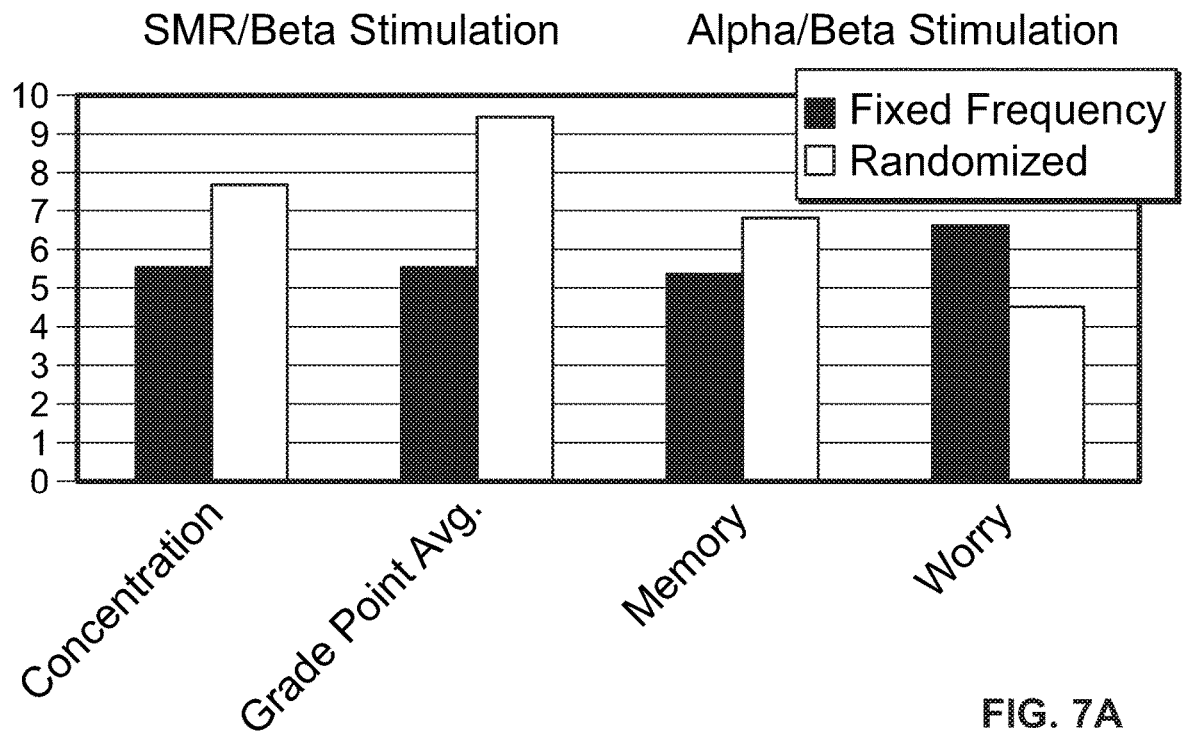
FIG. 7A is a graph comparing fixed AVE versus multi-randomized AVE with college students considering concentration, grade point average, memory and worry.

Multi-Randomized AVE in College Students for Concentration (FIG. 7A)

Figure 7B:
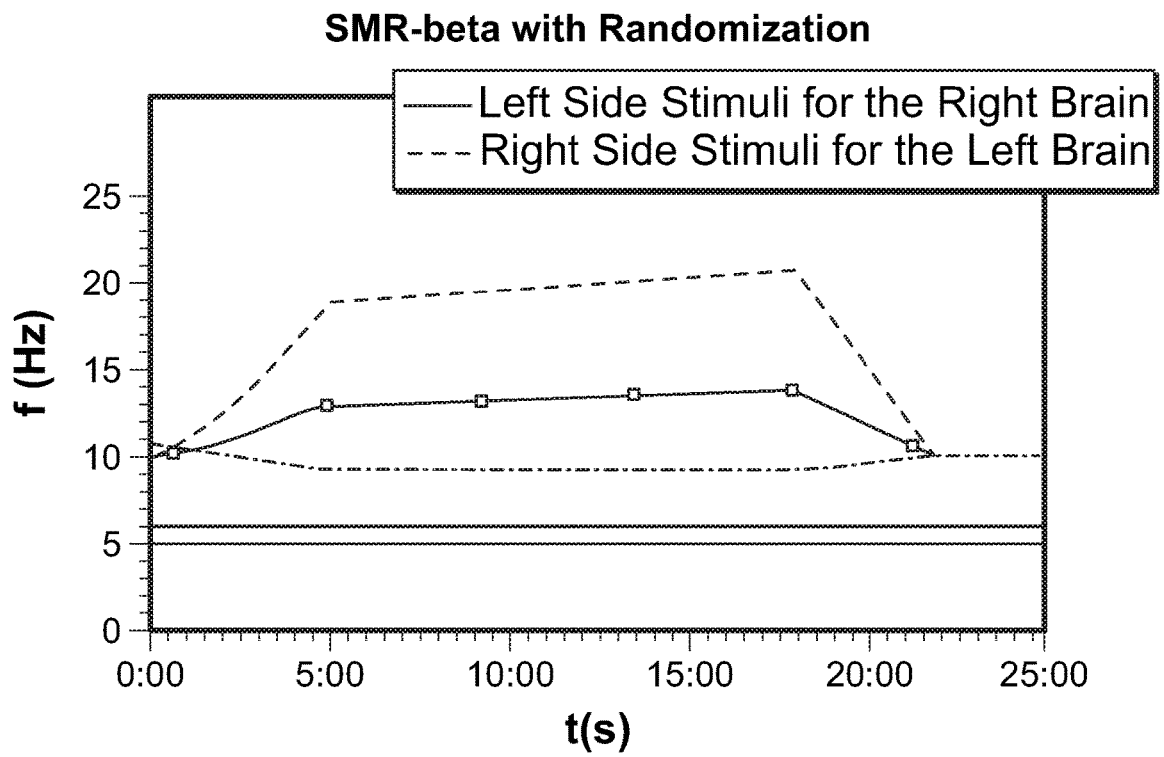
FIG. 7B is a graph using SMR-BETA with randomization showing frequency (Hz) v. time (s) traces of left side brain stimulation (solid line) and right side brain stimulation (dashed line)

SMR-Beta Protocol (FIG. 7B)

| Left Visual Field (both eyes) | Right Visual Field (both eyes) | Left ear audio (Same as left visual field, but independently randomized) | Right ear audio (Same as right visual field, but independently randomized) |
|---|---|---|---|
| Base f = about 13 Hz-about 14 Hz Randomized about ±1 Hz Range about 12 Hz-about 15 Hz T range about 2 s to about 15 s | Base f = about 19 Hz-about 21 Hz Randomized about ±1 Hz Range about 18 Hz-about 22 Hz T range about 2 to about 15 s | Base f = about 13 Hz-about 14 Hz Randomized about ±1 Hz Range about 12 Hz-about 15 Hz T range about 2 s to about 15 s | Base f = about 19 Hz-about 21 Hz Randomized about ±1 Hz Range about 18 Hz-about 22 Hz T range about 2 Hz to about 15 s |

Multi-Randomized AVE in College Students for Memory (FIG. 7A)

Alpha Protocol (FIG. 5B)

| Left Visual Field (both eyes) | Right Visual Field (both eyes) | Left ear audio (Same as left visual field, but independently randomized) | Right ear audio (Same as right visual field, but independently randomized) |
|---|---|---|---|
| Base f = about 9 Hz-about 10 Hz Randomized about ±1 Hz Range about 8 Hz-about 11 Hz T range about 2 s to about 15 s | Base f = about 10 Hz Randomized about ±1 Hz Range about 9 Hz-about 11 Hz T range about 2 s to about 15 s | Base f = about 9 Hz-about 10 Hz Randomized about ±1 Hz Range about 8 Hz-about 11 Hz T range about 2 s to about 15 s | Base f = about 10 Hz Randomized about ±1 Hz Range about 9 Hz-about 11 Hz T range about 2 s to about 15 s |

Multi-Randomized AVE in College Students for Worry (FIG. 7A) and Depression in Seniors (FIG. 6A)

Figure 9A:
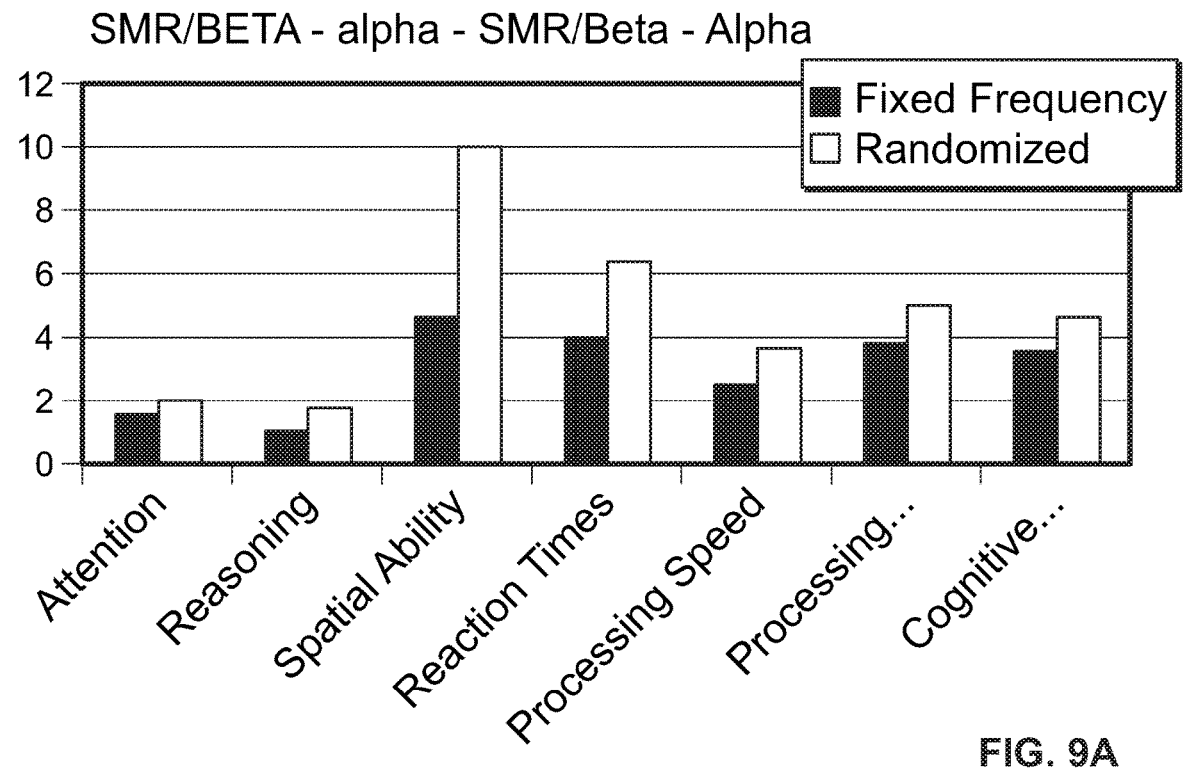
FIG. 9A is a graph comparing fixed AVE versus multi-randomized AVE with seniors—cognitive function assessment considering attention, reasoning, spatial ability, reaction times, processing speed, processing function, and cognitive function.
Figure 9B:
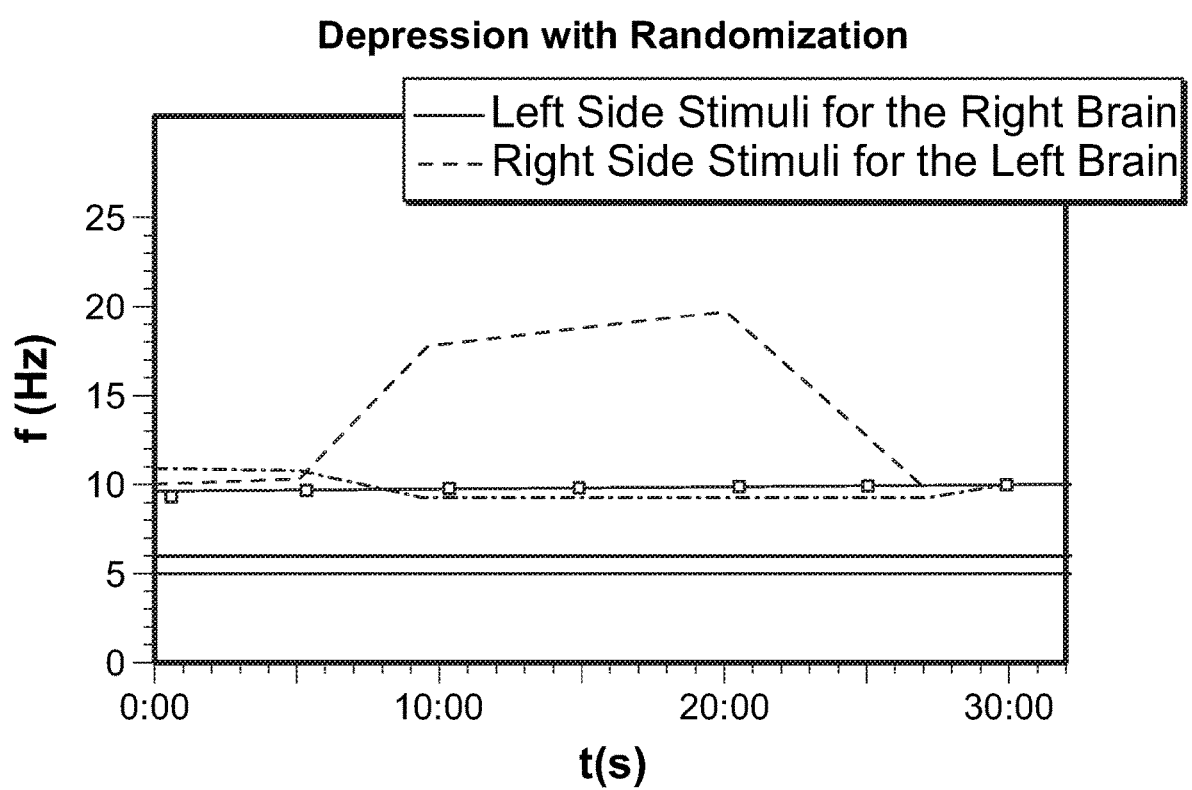
FIG. 9B is a graph showing frequency (Hz) v. time (s) traces of left side brain stimulation (solid line) and right side brain stimulation (dashed line)

Depression Protocol FIG. 9B

| Left Visual Field (both eyes) | Right Visual Field (both eyes) | Left ear audio (Same as left visual field, but independently randomized) | Right ear audio (Same as right visual field, but independently randomized) |
|---|---|---|---|
| Base f = about 10 Hz Randomized about ±1 Hz Range about 9 Hz-about 11 Hz T range about 2 s to about 15 s | Base f = about 19 Hz-21 Hz Randomized about ±1 Hz Range about 18-Hz about 22 Hz T range about 2 s to about 15 s | Base f = about 10 Hz Randomized about ±1 Hz Range about 9 Hz-about 11 Hz T range about 2 s to about 15 s | Base f = about 19 Hz-about 21 Hz Randomized about ±1 Hz Range about 18 Hz-about 22 Hz T range about 2 s to about 15 s |

The protocols that are effective in calming stress and addiction, also have been found to boost memory.

The depression study with seniors also found that the depression protocol (FIG. 9B) improved balance and reduced their risk of falling.

FIG. 7A shows results in concentration, grade point average, memory and worry are improved using the multi-randomized AVE method of 50 versus traditional fixed frequency AVE techniques.

Figure 8A:
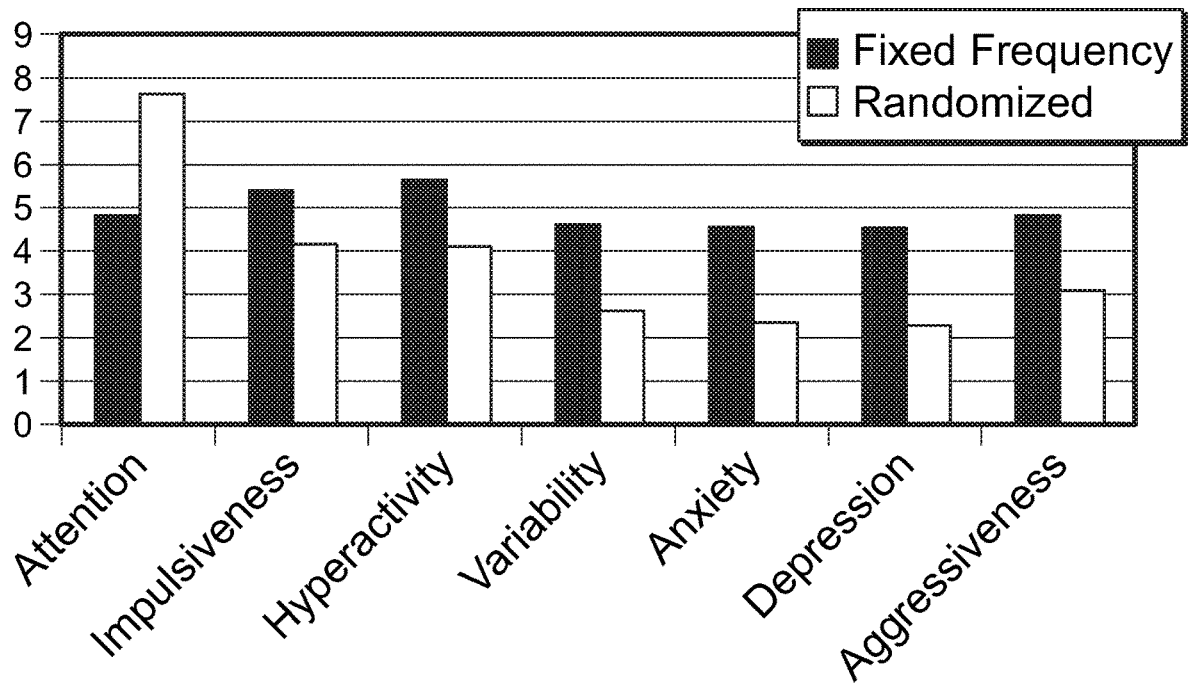
FIG. 8A is a graph comparing fixed AVE beta/SMR versus multi-randomized AVE in AHDH patients considering attention, impulsiveness, hyperactivity, variability, anxiety, depression and aggressiveness.

Multi-Randomized AVE for ADHD Treatment (FIG. 8A)

Figure 8B:
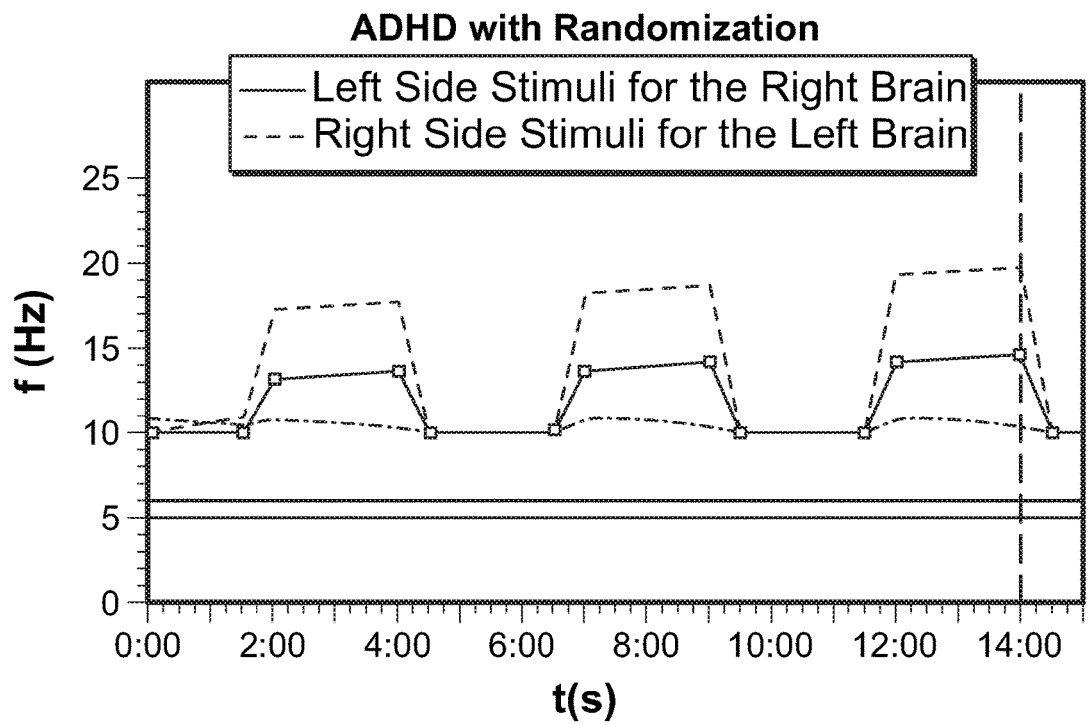
FIG. 8B is a graph using ADHD with randomization showing frequency (Hz) v. time (s) traces of left side brain stimulation (solid line) and right side brain stimulation (dashed line)

ADHD Protocol (FIG. 8B)

| Left Visual Field (both eyes) | Right Visual Field (both eyes) | Left ear audio (Same as left visual field, but independently randomized) | Right ear audio (Same as right visual field, but independently randomized) |
| --- | --- | --- | --- |
| Base f = about 13 Hz-about 14 Hz Randomized about ±1 Hz Range about 12 Hz-15 Hz T range about 2 s to about 15 s | Base f = about 17 Hz-about 20 Hz Randomized about ±1 Hz Range about 16 Hz-about 21 Hz T range about 2 s to about 15 s | Base f = about 13 Hz-about 14 Hz Randomized about ±1 Hz Range about 12 Hz-about 15 Hz T range about 2 s to about 15 s | Base f = about 17 Hz-about 20 Hz Randomized about ±1 Hz Range about 16 Hz-about 21 Hz T range about 2 s to about 15 s |

FIG. 8A shows results in attention, impulsiveness, hyperactivity, variability, anxiety, depression and aggressiveness are improved using the multi-randomized AVE method of 50 versus traditional fixed frequency AVE techniques.

Multi-Randomized AVE with Seniors (Microcog Points) (FIG. 9A)

Brain Brightener FIG. 6B

| Left Visual Field (both eyes) | Right Visual Field (both eyes) | Left ear audio Same as left visual field, but independently randomized | Right ear audio Same as right visual field, but independently randomized |
| --- | --- | --- | --- |
| Base f = about 10 Hz-about 14 Hz Randomized about ±1 Hz Range about 9 Hz-about 15 Hz T range about 2 s to about 15 s | Base f = about 10 Hz-about 21 Hz Randomized about ±1 Hz Range about 9 Hz-about 22 Hz T range about 2 s to about 15 s | Base f = about 10 Hz-about 14 Hz Randomized about ±1 Hz Range about 9 Hz-about 15 Hz T range about 2 s to about 15 s | Base f = about 10 Hz-about 21 Hz Randomized about ±1 Hz Range about 9 Hz-about 22 Hz T range about 2 s to about 15 s |

FIG. 9A shows results in attention, reasoning, spatial ability, reaction times, processing speed, processing function and cognitive function are improved using the multi-randomized AVE method of 50 versus traditional fixed frequency AVE techniques. MicroCog™ is a known assessment of cognitive functioning.

There is a type of TBI (Traumatic Brain Injury) that is identified as a thalamo-cortical Disconnect (TCD) caused by concussions and post viral infections. Neurologically it is characterized as low-voltage and choppy-looking EEG, where the person is unable to make alpha brain waves in the affected areas, with the eyes-closed. There are also severe comodulation, coherence and phase problems, seen in the EEG across the brain in most frequency bands. With a TCD, the inflicted are also unable to make proper delta waves during sleep.

Behaviorally, there is general anxiety, obsessive-compulsive disorder, and severe insomnia. The inflicted struggles with making logical choices, ends up making poor choices and is often very emotional—depressed one moment, anxious the next, aggressive the next and happy a few moments later, only to cycle through the emotions continually throughout the day. It is difficult to hold a job in this condition. This condition is common in hockey & football players and those in car accidents and falls to the floor, sidewalk, or road. This condition is believed to lead to Alzheimer's Disease and possibly Multiple Sclerosis. During this phase of the disorder (which can last over 20 years), OCD behaviors are severe (e.g., hoarders, counters, anorexics, ritualists, cutters (people who cut themselves), addicted gamers and committed substance abusers to depressants such as alcohol and marijuana).

In many cases, an application of randomized AVE according to the technologies described in the present application utilizing simultaneous SMR/beta stimulation can with randomized dips in frequency to alpha every few minutes and/or simultaneous and randomized alpha/beta stimulation completely resolves the TBI in a short time (e.g., about 20 minutes of continuous and uninterrupted application). The subject typically continues to use RAVE daily for around about 2-calendar months, at which time the treatment sticks and the subject can go on to leading a normal or near normal life.

The inventor's studies have shown that when audio-visual stimulation is randomized in time and frequency at all frequencies up to about ±1 Hz, the clinical results were improved significantly over a continuous, fixed frequency AVE. When audio-visual stimulation is randomized in time and frequency at all frequencies up to about ±2 Hz, the clinical results were improved slightly over a continuous, fixed frequency AVE. When audio-visual stimulation was randomized in time and frequency at frequencies above about ±3 Hz, the clinical results were poorer than stimulation at a continuous, fixed frequency AVE.

As previously described, the randomization is done via the control module 12 that provides independent left and right randomization of the left and right visual fields and auditory tone pulses in both time and frequency. A random number is established at start up (step 54), each time the control module 12 is powered up to generate a different set of randomized variables (step 56), thus preventing similar randomization occurring during repeated uses of the method. The left and right side stimulation (eyes and ears) may be randomized in synchrony with each other or independently of each other.

Figure 10:
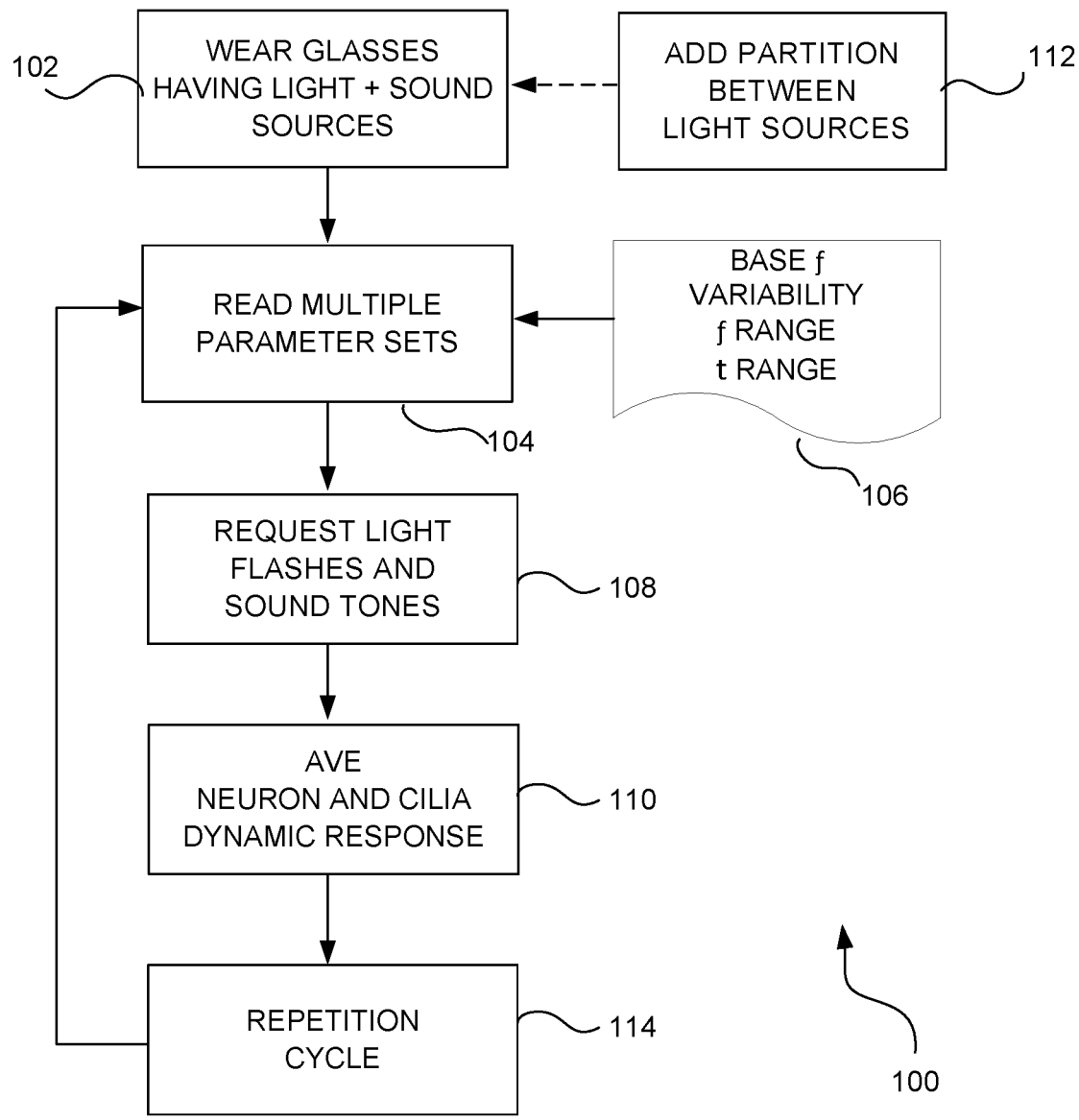
FIG. 10 is a flowchart illustrating a method used to implement various multi-randomized AVE protocols.

FIG. 10 illustrates a flowchart of a method 100 that can be used to implement the various multi-randomized AVE protocols described above:

causing (e.g., instructing, receiving) a pair of glasses to be worn at step 102 by a user (e.g., a human) having a right eye, a left eye, a right ear, a left ear, a neuron, and a glia. The right eye has a first right visual field and a first left visual field; the left eye has a second right visual field and a second left visual field; and the pair of glasses interacts/hosts a processor, a first light source (e.g., a light bulb or a light emitting diode), a second light source (e.g., a light bulb or a light emitting diode), a first sound source (e.g., a speaker), and a second sound source (e.g., a speaker);

causing the processor to read at step 104 a first set of parameters, a second set of parameters, a third set of parameters, and a fourth set of parameters. Each parameter set 106 includes a base frequency, a variability amount, a frequency range, and a time range. More particularly, the first set of parameters includes a first base frequency, a first amount of variability, a first frequency range, and a first-time range. The first frequency range is positively and negatively off the first base frequency based on the first amount of variability. The second set of parameters includes a second base frequency, a second amount of variability, a second frequency range, and a second time range. The second frequency range is positively and negatively off the second base frequency based on the second amount of variability. The third set of parameters includes a third base frequency, a third amount of variability, a third frequency range, and a third time range. The third frequency range is positively and negatively off the third base frequency based on the third amount of variability. The fourth set of parameters includes a fourth base frequency, a fourth amount of variability, a fourth frequency range, and a fourth time range. The fourth frequency range is positively and negatively off the fourth base frequency based on the fourth amount of variability; and causing the processor at step 108 to request light flashes (based on frequency and luminosity properties described herein) and sound tones as follows: (i) the first light source to flash a first light to the first right visual field and the second light source to flash a second light to the second right visual field according to a first frequency for a first duration of time; (ii) the first light source to flash a third light to the first left visual field and the second light source to flash a fourth light to the second left visual field according to a second frequency for a second duration of time; (iii) the first sound source to pulse a first sound to the right ear according to a third frequency for a third duration of time, and (iv) the second sound source to pulse a second sound to the left ear according to a fourth frequency for a fourth duration of time such that an audio-visual entrainment (AVE) occurs at step 110 and thereby causes the neuron and the glia to respond (e.g., within about 24, 23, 22, 21, 20, 19, 18, 17, 16, 15, 14, 13, 12, 11, 10, 9, 8, 7, 6, 5, 4, 2, 1 hours of such activity) dynamically to the AVE. The first frequency is randomly selected from the first frequency range and the first duration of time is randomly selected from the first-time range. The second frequency is randomly selected from the second frequency range and the second duration of time is randomly selected from the second time range. The third frequency is randomly selected from the third frequency range and the third duration of time is randomly selected from the third time range. The fourth frequency is randomly selected from the fourth frequency range and the fourth duration of time is randomly selected from the fourth time range.

The first amount of variability, the second amount of variability, the third amount of variability, or the fourth amount of variability is within about 3 Hz positively and negatively or the first amount of variability, the second amount of variability, the third amount of variability, or the fourth amount of variability is within about 2 Hz positively and negatively or the first amount of variability, the second amount of variability, the third amount of variability, or the fourth amount of variability is within about 1 Hz positively and negatively.

The method can include a step 112 of causing a partition (e.g., a wall that can be optically opaque, optically polarized, or optically filtering) to extend between the first light source and the second light source such that each of the first light source and the second light source is prevented from illuminating more than its respective visual field. The initial pair of glasses of step 102 can host the partition.

At steps 104 and 108 the first frequency can be randomly selected from the first frequency range and the first duration of time can be randomly selected from the first time range independent from (a) the second frequency being randomly selected from the second frequency range and the second duration of time being randomly selected from the second time range, (b) the third frequency being randomly selected from the third frequency range and the third duration of time being randomly selected from the third time range, or (c) the fourth frequency being randomly selected from the fourth frequency range and the fourth duration of time being randomly selected from the fourth time range. The first frequency can be randomly selected from the first frequency range and the first duration of time can be randomly selected from the first time range independent from at least two of (a) the second frequency being randomly selected from the second frequency range and the second duration of time being randomly selected from the second time range, (b) the third frequency being randomly selected from the third frequency range and the third duration of time being randomly selected from the third time range, or (c) the fourth frequency being randomly selected from the fourth frequency range and the fourth duration of time being randomly selected from the fourth time range. The first frequency can be randomly selected from the first frequency range and the first duration of time can be randomly selected from the first time range independent from all of (a) the second frequency being randomly selected from the second frequency range and the second duration of time being randomly selected from the second time range, (b) the third frequency being randomly selected from the third frequency range and the third duration of time being randomly selected from the third time range, or (c) the fourth frequency being randomly selected from the fourth frequency range and the fourth duration of time being randomly selected from the fourth time range.

The method 100 at step 104 and 108 includes the processor coordinating (a) the first light source for the first right visual field and the second right visual field with the first sound source or (b) the second light source for the first left visual field and the second left visual field with the second source.

The method 100 (at 106), where the first amount of variability, the second amount of variability, the third amount of variability, or the fourth amount of variability is between about 0.1 Hz and about 3 Hz positively and negatively.

The method 100 further including causing a repetition to occur at 114, where the repetition includes causing the processor to request at least one of (a) the first light source to flash a first light to the first right visual field and the second light source to flash a second light to the second right visual field according to the first frequency for the first duration of time, (b) the first light source to flash the third light to the first left visual field and the second light source to flash the fourth light to the second left visual field according to the second frequency for a second duration of time, (c) the first sound source to pulse the first sound to the right ear according to the third frequency for the third duration of time, or (d) the second sound source to pulse the second sound to the left ear according to the fourth frequency for the fourth duration of time such that a respective linear transition occurs.

The method 100, where at least one of the first base frequency, the second base frequency, the third base frequency, or the fourth base frequency is between about 10 Hz and about 21 Hz. At least one of the first amount of variability, the second amount of variability, the third amount of variability, or the fourth amount of variability is between about 0.1 Hz and about 3 Hz positively and negatively. At least one of the first-time range, the second time range, the third time range, or the fourth time range is between about 2 seconds and about 15 seconds.

The method 100, where at least one of the first-time range, the second time range, the third time range, or the fourth time range is between about 2 seconds and about 15 seconds. At least one of the first base frequency, the second base frequency, the third base frequency, or the fourth base frequency is between about 10 Hz and about 21 Hz. At least one of the first amount of variability, the second amount of variability, the third amount of variability, or the fourth amount of variability is between about 0.1 Hz and about 3 Hz positively and negatively.

Example embodiments include:

A method of stimulating a central nervous system and brain waves of a human subject for an application period, the human subject having a left eye, a right eye, a left ear and a right ear by multi-randomized audio-visual entrainment (AVE) administered by an AVE apparatus having a light generating component (e.g., a light bulb, a light emitting diode) for providing a left flashing light to the left visual fields of both eyes of the subject and a right flashing light to the right visual fields of both eyes of the subject and a sound generating component (e.g., a speaker) for independently providing a left side pulsating sound signal to the left ear and a right side pulsating sound signal to the right ear of the subject and a controller operably connected to the light generating component and the sound generating component for randomizing frequency and stimulation time both within a prescribed range of (i) the left flashing light; (ii) the right flashing light; (iii) the left side pulsating sound signal; and (iv) the right side pulsating sound signal; the method comprising:

administering the left flashing light to the left visual field of both eyes of the subject and the right flashing light to the right visual fields of both eyes of the subject, wherein the left flashing light and the right flashing light are randomized, within the prescribed range, in frequency and time independently of each other;

administering the left side pulsating sound signal to the left ear and the right-side pulsating sound signal to the right ear of the subject, wherein the left side pulsating sound signal and the right side pulsating sound signal are both randomized, within the prescribed range, in frequency and time independently of each other; and repeating steps (a) and (b) for the application period.

The method as above where the transition between the stimulation frequencies and stimulation segments is linear.

The method as above where:

(i) the left flashing light that stimulates the left visual fields of both eyes operates at a random frequency between about 10 Hz and about 16 Hz (about 13 Hz at about ±3.0 Hz) for a random duration of between about 2 seconds to about 15 seconds;

(ii) the right flashing light that stimulates the right visual fields of both eyes operates at a random frequency between about 17 Hz to about 23 Hz (about 20 Hz at about ±3.0 Hz) for a random duration of between about 2 seconds to about 15 seconds;

(iii) the left side pulsating sound signal to the left ear operates at a random frequency between about 10 Hz to about 16 Hz (about 13 Hz at about ±3.0 Hz) for a random duration of between about 2 seconds to about 15 seconds; and (iv) the right side pulsating sound signal to the right ear operates at a random frequency between about 17 Hz to about 23 Hz (about 20 Hz at about ±3.0 Hz) for a random duration of between about 2 seconds to about 15 seconds.

The method as above, where:

(i) the left flashing light that stimulates the left visual fields of both eyes operates at a random frequency between about 7 Hz and about 13 Hz (about 10 Hz at about ±3.0 Hz) for a random duration of between about 2 seconds to about 15 seconds;

(ii) the right flashing light that stimulates the right visual fields of both eyes operates at a random frequency between about 17 Hz to about 23 Hz (about 20 Hz at about ±3.0 Hz) for a random duration of between about 2 seconds to about 15 seconds;

(iii) the left side pulsating sound signal to the left ear operates at a random frequency between about 7 Hz to about 13 Hz (about 10 Hz at about ±3.0 Hz) for a random duration of between about 2 seconds to about 15 seconds; and (iv) the right side pulsating sound signal to the right ear operates at a random frequency between about 17 Hz to about 23 Hz (about 20 Hz at about ±3.0 Hz) for a random duration of between about 2 seconds to about 15 seconds.

The method as above, where:

(i) the left flashing light that stimulates the left visual fields of both eyes operates at a random frequency between about 9 Hz and about 11 Hz for a random duration of between about 2 seconds to about 15 seconds;

(ii) the right flashing light that stimulates the right visual fields of both eyes operates at a random frequency between about 9 Hz to about 11 Hz for a random duration of between about 2 seconds to about 15 seconds;

(iii) the left side pulsating sound signal to the left ear operates at random frequency between about 9 Hz and about 11 Hz for a random duration of between about 2 seconds to about 15 seconds; and (iv) the right side pulsating sound signal to the right ear operates at a random frequency between about 9 Hz and about 11 Hz for a random duration of between about 2 seconds to about 15 seconds.

The method as above, where:

(i) the left flashing light that stimulates the left visual fields of both eyes operates at a random frequency between about 9 Hz and about 11 Hz for a random duration of between about 2 seconds to about 15 seconds;

(ii) the right flashing light that stimulates the right visual fields of both eyes operates at a random frequency between about 19 Hz to about 21 Hz for a random duration of between about 2 seconds to about 15 seconds;

(iii) the left side pulsating sound signal to the left ear operates at random frequency between about 9 Hz and about 11 Hz for a random duration of between about 2 seconds to about 15 seconds; and (iv) the right side pulsating sound signal to the right ear operates at a random frequency between about 19 Hz and about 21 Hz for a random duration of between about 2 seconds to about 15 seconds.

To summarize, the features of the described embodiments include:

(a) randomizing, within prescribed ranges, in both time and frequency, left and right visual field stimulation, independently of each other;

(b) randomizing, within prescribed ranges, in both time and frequency, left and right auditory pulsed tones, independently of each other;

(c) randomizing the randomization between user entrainment sessions using a random base variable (see step 54 of method 50 in FIG. 3) that is established at the time of powering up the control module 12;

(d) using left side frequencies in the about 10 Hz about 16 Hz range (start f=about 13 Hz at about ±3 Hz) and right-side stimulation in the about 17 Hz about 23 Hz range (start f=about 20 Hz at about ±3 Hz) for the treatment of concussions and traumatic brain injuries and for enhancing cognition in colleges students & seniors and reducing symptoms of inattention, hyperactivity, impulsiveness and variability in person struggling with symptoms of ADD and ADHD and other medical conditions disclosed herein. For example, these methods can be configured to prevent, diagnose, monitor, ameliorate, or treat neurological, neuropsychological, or neuropsychiatric activity, such as a modulation of neuronal function or processing to affect a functional outcome. The modulation of neuronal function can be useful regarding diagnosing, monitoring, preventing, treating, or ameliorating neurological, psychiatric, psychological, conscious state, behavioral, mood, or thought activity. For example, this activity can manifests itself in a form of a disorder, such as attention or cognitive disorders (e.g., Autistic Spectrum Disorders), mood disorder (e.g., major depressive disorder, bipolar disorder, dysthymic disorder), anxiety disorder (e.g., panic disorder, post-traumatic stress disorder, obsessive-compulsive disorder, phobic disorder); neurodegenerative diseases (e.g., multiple sclerosis, Alzheimer's disease, amyotrophic lateral sclerosis (ALS), Parkinson's disease, Huntington's Disease, Guillain-Barre syndrome, myasthenia gravis, and chronic idiopathic demyelinating disease (CID)), movement disorders (e.g., dyskinesia, tremor, dystonia, chorea and ballism, tic syndromes, Tourette's Syndrome, myoclonus, drug-induced movement disorders, Wilson's Disease, Paroxysmal Dyskinesias, Stiff Man Syndrome and Akinetic-Ridgid Syndromes and Parkinsonism), epilepsy, tinnitus, pain, phantom pain, diabetes neuropathy, enhancing or diminishing any neurological or psychiatric function not just an abnormality or disorder or others, as understood to skilled artisans and which are only omitted here for brevity. Neurological activity that may be modulated can include normal functions, such as alertness, conscious state, drive, fear, anger, anxiety, repetitive behavior, impulses, urges, obsessions, euphoria, sadness, and the fight or flight response, as well as instability, vertigo, dizziness, fatigue, photophobia, concentration dysfunction, memory disorders, headache, dizziness, irritability, fatigue, visual disturbances, sensitivity to noise (misophonia, hyperacusis, phonophobia), judgment problems, depression, symptoms of traumatic brain injury (whether physical, emotional, social, or chemical), autonomic functions, which includes sympathetic or parasympathetic functions (e.g., control of heart rate), somatic functions, or enteric functions;

(e) using left side frequencies in the about 10 Hz about 16 Hz range (start f=about 13 Hz at about ±3 Hz) and right-side stimulation in the about 17 Hz about 23 Hz range (start f about =20 Hz at about ±3 Hz) for the prevention of chronic traumatic encephalitis and Alzheimer's Disease and other medical conditions disclosed herein. For example, these methods can be configured to prevent, diagnose, monitor, ameliorate, or treat neurological, neuropsychological, or neuropsychiatric activity, such as a modulation of neuronal function or processing to affect a functional outcome. The modulation of neuronal function can be useful regarding diagnosing, monitoring, preventing, treating, or ameliorating neurological, psychiatric, psychological, conscious state, behavioral, mood, or thought activity. For example, this activity can manifests itself in a form of a disorder, such as attention or cognitive disorders (e.g., Autistic Spectrum Disorders), mood disorder (e.g., major depressive disorder, bipolar disorder, dysthymic disorder), anxiety disorder (e.g., panic disorder, post-traumatic stress disorder, obsessive-compulsive disorder, phobic disorder); neurodegenerative diseases (e.g., multiple sclerosis, Alzheimer's disease, amyotrophic lateral sclerosis (ALS), Parkinson's disease, Huntington's Disease, Guillain-Barre syndrome, myasthenia gravis, and chronic idiopathic demyelinating disease (CID)), movement disorders (e.g., dyskinesia, tremor, dystonia, chorea and ballism, tic syndromes, Tourette's Syndrome, myoclonus, drug-induced movement disorders, Wilson's Disease, Paroxysmal Dyskinesias, Stiff Man Syndrome and Akinetic-Ridgid Syndromes and Parkinsonism), epilepsy, tinnitus, pain, phantom pain, diabetes neuropathy, enhancing or diminishing any neurological or psychiatric function not just an abnormality or disorder or others, as understood to skilled artisans and which are only omitted here for brevity. Neurological activity that may be modulated can include normal functions, such as alertness, conscious state, drive, fear, anger, anxiety, repetitive behavior, impulses, urges, obsessions, euphoria, sadness, and the fight or flight response, as well as instability, vertigo, dizziness, fatigue, photophobia, concentration dysfunction, memory disorders, headache, dizziness, irritability, fatigue, visual disturbances, sensitivity to noise (misophonia, hyperacusis, phonophobia), judgment problems, depression, symptoms of traumatic brain injury (whether physical, emotional, social, or chemical), autonomic functions, which includes sympathetic or parasympathetic functions (e.g., control of heart rate), somatic functions, or enteric functions;

(f) using left side frequencies in the about 7 Hz about 13 Hz range (start f=about 10 Hz at about ±3 Hz) and right-side stimulation in the about 17 Hz about 23 Hz range (start f=about 20 Hz at about ±3 Hz) for the prevention of depression and other medical conditions disclosed herein. For example, these methods can be configured to prevent, diagnose, monitor, ameliorate, or treat neurological, neuropsychological, or neuropsychiatric activity, such as a modulation of neuronal function or processing to affect a functional outcome. The modulation of neuronal function can be useful regarding diagnosing, monitoring, preventing, treating, or ameliorating neurological, psychiatric, psychological, conscious state, behavioral, mood, or thought activity. For example, this activity can manifests itself in a form of a disorder, such as attention or cognitive disorders (e.g., Autistic Spectrum Disorders), mood disorder (e.g., major depressive disorder, bipolar disorder, dysthymic disorder), anxiety disorder (e.g., panic disorder, post-traumatic stress disorder, obsessive-compulsive disorder, phobic disorder); neurodegenerative diseases (e.g., multiple sclerosis, Alzheimer's disease, amyotrophic lateral sclerosis (ALS), Parkinson's disease, Huntington's Disease, Guillain-Barre syndrome, myasthenia gravis, and chronic idiopathic demyelinating disease (CID)), movement disorders (e.g., dyskinesia, tremor, dystonia, chorea and ballism, tic syndromes, Tourette's Syndrome, myoclonus, drug-induced movement disorders, Wilson's Disease, Paroxysmal Dyskinesias, Stiff Man Syndrome and Akinetic-Ridgid Syndromes and Parkinsonism), epilepsy, tinnitus, pain, phantom pain, diabetes neuropathy, enhancing or diminishing any neurological or psychiatric function not just an abnormality or disorder or others, as understood to skilled artisans and which are only omitted here for brevity. Neurological activity that may be modulated can include normal functions, such as alertness, conscious state, drive, fear, anger, anxiety, repetitive behavior, impulses, urges, obsessions, euphoria, sadness, and the fight or flight response, as well as instability, vertigo, dizziness, fatigue, photophobia, concentration dysfunction, memory disorders, headache, dizziness, irritability, fatigue, visual disturbances, sensitivity to noise (misophonia, hyperacusis, phonophobia), judgment problems, depression, symptoms of traumatic brain injury (whether physical, emotional, social, or chemical), autonomic functions, which includes sympathetic or parasympathetic functions (e.g., control of heart rate), somatic functions, or enteric functions; and (g) using left side frequencies in the about 6 Hz about 12 Hz range (start f=about 9 Hz at about ±3 Hz) and right-side stimulation also in the about 6 Hz about 12 Hz range (start f=about 9 Hz at about ±3 Hz) (but at frequencies independent of each other) for the generation of deep relaxation, hypnotic induction, dissociation and meditation for the resolution of stress and anxiety, and other medical conditions disclosed herein. For example, these methods can be configured to prevent, diagnose, monitor, ameliorate, or treat neurological, neuropsychological, or neuropsychiatric activity, such as a modulation of neuronal function or processing to affect a functional outcome. The modulation of neuronal function can be useful regarding diagnosing, monitoring, preventing, treating, or ameliorating neurological, psychiatric, psychological, conscious state, behavioral, mood, or thought activity. For example, this activity can manifests itself in a form of a disorder, such as attention or cognitive disorders (e.g., Autistic Spectrum Disorders), mood disorder (e.g., major depressive disorder, bipolar disorder, dysthymic disorder), anxiety disorder (e.g., panic disorder, post-traumatic stress disorder, obsessive-compulsive disorder, phobic disorder); neurodegenerative diseases (e.g., multiple sclerosis, Alzheimer's disease, amyotrophic lateral sclerosis (ALS), Parkinson's disease, Huntington's Disease, Guillain-Barre syndrome, myasthenia gravis, and chronic idiopathic demyelinating disease (CID)), movement disorders (e.g., dyskinesia, tremor, dystonia, chorea and ballism, tic syndromes, Tourette's Syndrome, myoclonus, drug-induced movement disorders, Wilson's Disease, Paroxysmal Dyskinesias, Stiff Man Syndrome and Akinetic-Ridgid Syndromes and Parkinsonism), epilepsy, tinnitus, pain, phantom pain, diabetes neuropathy, enhancing or diminishing any neurological or psychiatric function not just an abnormality or disorder or others, as understood to skilled artisans and which are only omitted here for brevity. Neurological activity that may be modulated can include normal functions, such as alertness, conscious state, drive, fear, anger, anxiety, repetitive behavior, impulses, urges, obsessions, euphoria, sadness, and the fight or flight response, as well as instability, vertigo, dizziness, fatigue, photophobia, concentration dysfunction, memory disorders, headache, dizziness, irritability, fatigue, visual disturbances, sensitivity to noise (misophonia, hyperacusis, phonophobia), judgment problems, depression, symptoms of traumatic brain injury (whether physical, emotional, social, or chemical), autonomic functions, which includes sympathetic or parasympathetic functions (e.g., control of heart rate), somatic functions, or enteric functions.

What is claimed is:

1. A method comprising:
   causing a pair of glasses to be worn by a user having a right eye, a left eye, a right ear, a left ear, a neuron, and a glia, wherein the right eye has a first right visual field and a first left visual field, wherein the left eye has a second right visual field and a second left visual field, wherein the pair of glasses hosts a processor, a first light source, a second light source, a first sound source, and a second sound source;
   causing the processor to read a first set of parameters, a second set of parameters, a third set of parameters, and a fourth set of parameters, wherein the first set of parameters includes a first base frequency, a first amount of variability, a first frequency range, and a first time range, wherein the first frequency range is positively and negatively off the first base frequency based on the first amount of variability, wherein the second set of parameters includes a second base frequency, a second amount of variability, a second frequency range, and a second time range, wherein the second frequency range is positively and negatively off the second base frequency based on the second amount of variability, wherein the third set of parameters includes a third base frequency, a third amount of variability, a third frequency range, and a third time range, wherein the third frequency range is positively and negatively off the third base frequency based on the third amount of variability, wherein the fourth set of parameters includes a fourth base frequency, a fourth amount of variability, a fourth frequency range, and a fourth time range, wherein the fourth frequency range is positively and negatively off the fourth base frequency based on the fourth amount of variability; and causing the processor to request (a) the first light source to flash a first light to the first right visual field and the second light source to flash a second light to the second right visual field according to a first frequency for a first duration of time, (b) the first light source to flash a third light to the first left visual field and the second light source to flash a fourth light to the second left visual field according to a second frequency for a second duration of time, (c) the first sound source to pulse a first sound to the right ear according to a third frequency for a third duration of time, and (d) the second sound source to pulse a second sound to the left ear according to a fourth frequency for a fourth duration of time such that an audio-visual entrainment (AVE) occurs and thereby causes the neuron and the glia to respond dynamically to the AVE, wherein the first frequency is randomly selected from the first frequency range and the first duration of time is randomly selected from the first time range, wherein the second frequency is randomly selected from the second frequency range and the second duration of time is randomly selected from the second time range, wherein the third frequency is randomly selected from the third frequency range and the third duration of time is randomly selected from the third time range, wherein the fourth frequency is randomly selected from the fourth frequency range and the fourth duration of time is randomly selected from the fourth time range.

2. The method of claim 1, wherein the first amount of variability, the second amount of variability, the third amount of variability, or the fourth amount of variability is within about 3 Hz positively and negatively.

3. The method of claim 2, wherein the first amount of variability, the second amount of variability, the third amount of variability, or the fourth amount of variability is within about 2 Hz positively and negatively.

4. The method of claim 3, wherein the first amount of variability, the second amount of variability, the third amount of variability, or the fourth amount of variability is within about 1 Hz positively and negatively.

5. The method of claim 1, further comprising:
causing a partition to extend between the first light source and the second light source such that each of the first light source and the second light source is prevented from illuminating more than its respective visual field.

6. The method of claim 5, wherein the pair of glasses hosts the partition.

7. The method of claim 1, wherein the first frequency is randomly selected from the first frequency range and the first duration of time is randomly selected from the first time range independent from (a) the second frequency being randomly selected from the second frequency range and the second duration of time being randomly selected from the second time range, (b) the third frequency being randomly selected from the third frequency range and the third duration of time being randomly selected from the third time range, or (c) the fourth frequency being randomly selected from the fourth frequency range and the fourth duration of time being randomly selected from the fourth time range.

8. The method of claim 7, wherein the first frequency is randomly selected from the first frequency range and the first duration of time is randomly selected from the first time range independent from at least two of (a) the second frequency being randomly selected from the second frequency range and the second duration of time being randomly selected from the second time range, (b) the third frequency being randomly selected from the third frequency range and the third duration of time being randomly selected from the third time range, or (c) the fourth frequency being randomly selected from the fourth frequency range and the fourth duration of time being randomly selected from the fourth time range.

9. The method of claim 8, wherein the first frequency is randomly selected from the first frequency range and the first duration of time is randomly selected from the first time range independent from all of (a) the second frequency being randomly selected from the second frequency range and the second duration of time being randomly selected from the second time range, (b) the third frequency being randomly selected from the third frequency range and the third duration of time being randomly selected from the third time range, or (c) the fourth frequency being randomly selected from the fourth frequency range and the fourth duration of time being randomly selected from the fourth time range.

10. The method of claim 8, wherein the processor coordinates (a) the first light source for the first right visual field and the second right visual field with the first sound source or (b) the second light source for the first left visual field and the second left visual field with the second source.

11. The method of claim 1, wherein the first amount of variability, the second amount of variability, the third amount of variability, or the fourth amount of variability is between about 0.1 Hz and about 3 Hz positively and negatively.

12. The method of claim 1, further comprising:
causing a repetition to occur, wherein the repetition includes causing the processor to request at least one of (a) the first light source to flash a first light to the first right visual field and the second light source to flash a second light to the second right visual field according to the first frequency for the first duration of time, (b) the first light source to flash the third light to the first left visual field and the second light source to flash the fourth light to the second left visual field according to the second frequency for a second duration of time, (c) the first sound source to pulse the first sound to the right ear according to the third frequency for the third duration of time, or (d) the second sound source to pulse the second sound to the left ear according to the fourth frequency for the fourth duration of time such that a respective linear transition occurs.

13. The method of claim 1, wherein at least one of the first base frequency, the second base frequency, the third base frequency, or the fourth base frequency is between about 10 Hz and about 21 Hz.

14. The method of claim of 13, wherein at least one of the first amount of variability, the second amount of variability, the third amount of variability, or the fourth amount of variability is between about 0.1 Hz and about 3 Hz positively and negatively.

15. The method of claim 14, wherein at least one of the first time range, the second time range, the third time range, or the fourth time range is between about 2 seconds and about 15 seconds.

16. The method of claim 1, wherein at least one of the first time range, the second time range, the third time range, or the fourth time range is between about 2 seconds and about 15 seconds.

17. The method of claim 16, wherein at least one of the first base frequency, the second base frequency, the third base frequency, or the fourth base frequency is between about 10 Hz and about 21 Hz.

18. The method of claim of 17, wherein at least one of the first amount of variability, the second amount of variability, the third amount of variability, or the fourth amount of variability is between about 0.1 Hz and about 3 Hz positively and negatively.

19. A non-transitory memory storing a set of instructions executable by a processor of a pair of glasses when the pair of glasses is worn by a user having a right eye, a left eye, a right ear, a left ear, a neuron, and a glia, wherein the right eye has a first right visual field and a first left visual field, wherein the left eye has a second right visual field and a second left visual field, wherein the pair of glasses hosts a first light source, a second light source, a first sound source, and a second sound source, wherein the set of instructions causes the processor to: read a first set of parameters, a second set of parameters, a third set of parameters, and a fourth set of parameters, wherein the first set of parameters includes a first base frequency, a first amount of variability, a first frequency range, and a first time range, wherein the first frequency range is positively and negatively off the first base frequency based on the first amount of variability, wherein the second set of parameters includes a second base frequency, a second amount of variability, a second frequency range, and a second time range, wherein the second frequency range is positively and negatively off the second base frequency based on the second amount of variability, wherein the third set of parameters includes a third base frequency, a third amount of variability, a third frequency range, and a third time range, wherein the third frequency range is positively and negatively off the third base frequency based on the third amount of variability, wherein the fourth set of parameters includes a fourth base frequency, a fourth amount of variability, a fourth frequency range, and a fourth time range, wherein the fourth frequency range is positively and negatively off the fourth base frequency based on the fourth amount of variability; and request (a) the first light source to flash a first light to the first right visual field and the second light source to flash a second light to the second right visual field according to a first frequency for a first duration of time, (b) the first light source to flash a third light to the first left visual field and the second light source to flash a fourth light to the second left visual field according to a second frequency for a second duration of time, (c) the first sound source to pulse a first sound to the right ear according to a third frequency for a third duration of time, and (d) the second sound source to pulse a second sound to the left ear according to a fourth frequency for a fourth duration of time such that an audio-visual entrainment (AVE) occurs and thereby causes the neuron and the glia to respond dynamically to the AVE, wherein the first frequency is randomly selected from the first frequency range and the first duration of time is randomly selected from the first time range, wherein the second frequency is randomly selected from the second frequency range and the second duration of time is randomly selected from the second time range, wherein the third frequency is randomly selected from the third frequency range and the third duration of time is randomly selected from the third time range, wherein the fourth frequency is randomly selected from the fourth frequency range and the fourth duration of time is randomly selected from the fourth time range.

20. A device including:
a pair of glasses configured to be worn by a user having a right eye, a left eye, a right ear, a left ear, a neuron, and a glia, wherein the right eye has a first right visual field and a first left visual field, wherein the left eye has a second right visual field and a second left visual field, wherein the pair of glasses hosts a processor, a first light source, a second light source, a first sound source, and a second sound source, wherein the processor is programmed to:
read a first set of parameters, a second set of parameters, a third set of parameters, and a fourth set of parameters, wherein the first set of parameters includes a first base frequency, a first amount of variability, a first frequency range, and a first time range, wherein the first frequency range is positively and negatively off the first base frequency based on the first amount of variability, wherein the second set of parameters includes a second base frequency, a second amount of variability, a second frequency range, and a second time range, wherein the second frequency range is positively and negatively off the second base frequency based on the second amount of variability, wherein the third set of parameters includes a third base frequency, a third amount of variability, a third frequency range, and a third time range, wherein the third frequency range is positively and negatively off the third base frequency based on the third amount of variability, wherein the fourth set of parameters includes a fourth base frequency, a fourth amount of variability, a fourth frequency range, and a fourth time range, wherein the fourth frequency range is positively and negatively off the fourth base frequency based on the fourth amount of variability; and
request (a) the first light source to flash a first light to the first right visual field and the second light source to flash a second light to the second right visual field according to a first frequency for a first duration of time, (b) the first light source to flash a third light to the first left visual field and the second light source to flash a fourth light to the second left visual field according to a second frequency for a second duration of time, (c) the first sound source to pulse a first sound to the right ear according to a third frequency for a third duration of time, and (d) the second sound source to pulse a second sound to the left ear according to a fourth frequency for a fourth duration of time such that an audio-visual entrainment (AVE) occurs and thereby causes the neuron and the glia to respond dynamically to the AVE, wherein the first frequency is randomly selected from the first frequency range and the first duration of time is randomly selected from the first time range, wherein the second frequency is randomly selected from the second frequency range and the second duration of time is randomly selected from the second time range, wherein the third frequency is randomly selected from the third frequency range and the third duration of time is randomly selected from the third time range, wherein the fourth frequency is randomly selected from the fourth frequency range and the fourth duration of time is randomly selected from the fourth time range.

\* \* \* \* \*